(12) United States Patent
Takenaka et al.

(10) Patent No.: US 12,147,721 B2
(45) Date of Patent: Nov. 19, 2024

(54) IMAGE FORMING APPARATUS, METHOD FOR CONTROLLING SAME, AND STORAGE MEDIUM

(71) Applicant: CANON KABUSHIKI KAISHA, Tokyo (JP)

(72) Inventors: Yoko Takenaka, Chiba (JP); Akinori Takeo, Kanagawa (JP); Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/052,370

(22) Filed: Nov. 3, 2022

(65) Prior Publication Data
US 2023/0146069 A1    May 11, 2023

(30) Foreign Application Priority Data
Nov. 9, 2021   (JP) ................................ 2021-182644

(51) Int. Cl.
| | | |
|---|---|---|
| G06F 3/12 | (2006.01) | |
| G06K 15/02 | (2006.01) | |
| H04N 1/00 | (2006.01) | |
| H04N 1/44 | (2006.01) | |

(52) U.S. Cl.
CPC .......... G06F 3/1238 (2013.01); G06F 3/1205 (2013.01); G06F 3/1248 (2013.01)

(58) Field of Classification Search
None
See application file for complete search history.

(56) References Cited

U.S. PATENT DOCUMENTS

| | | | |
|---|---|---|---|
| 2002/0051524 A1* | 5/2002 | Satomi ................... | H04L 67/04 379/88.13 |
| 2003/0163444 A1* | 8/2003 | Kotzin ................ | G06F 16/9574 |
| 2007/0177165 A1* | 8/2007 | Xie ........................ | G06F 3/1206 715/205 |
| 2009/0009793 A1* | 1/2009 | Ozawa ............... | H04N 1/00482 358/1.15 |
| 2010/0024011 A1* | 1/2010 | Fukuoka ................. | G06F 16/93 726/5 |
| 2010/0171973 A1* | 7/2010 | Kimura ................. | G06F 3/1228 358/1.14 |

(Continued)

FOREIGN PATENT DOCUMENTS

| | | | | |
|---|---|---|---|---|
| JP | 2001306520 | * | 11/2001 | ............. G06F 13/00 |
| JP | 2004005428 | * | 1/2004 | ......... G06K 15/1823 |

(Continued)

*Primary Examiner* — Beniyam Menberu
(74) *Attorney, Agent, or Firm* — Canon U.S.A., Inc. IP Division

(57) ABSTRACT

An image forming apparatus issues a content display trigger if a predetermined event related to a user operation is received. When the content display trigger is issued, the image forming apparatus acquires web content from a content server based on path information set on a signage setting screen, and displays the acquired web content. If a hyperlink in the web content is pressed on the displayed web content, the image forming apparatus downloads content to be printed that is the linked content, and displays a print dialog on the web content. The image forming apparatus prints the content to be printed if an instruction to print the content to be printed is issued using the print dialog.

19 Claims, 35 Drawing Sheets

(56) References Cited

U.S. PATENT DOCUMENTS

| | | | |
|---|---|---|---|
| 2010/0309497 A1* | 12/2010 | Oikawa | H04N 1/00464 358/1.9 |
| 2011/0239059 A1* | 9/2011 | Sugimoto | H04N 1/00464 714/57 |
| 2015/0347875 A1* | 12/2015 | Akiyama | G06F 3/1207 358/1.15 |
| 2017/0331965 A1* | 11/2017 | Ikeda | G06F 3/1238 |
| 2019/0004751 A1* | 1/2019 | Ikeda | H04N 1/00427 |
| 2019/0306333 A1* | 10/2019 | Watariuchi | H04N 1/00474 |
| 2019/0349492 A1* | 11/2019 | Takenaka | G06Q 30/0242 |
| 2021/0200847 A1* | 7/2021 | Jung | H04M 1/67 |
| 2023/0012787 A1* | 1/2023 | Agarwal | H04L 12/4641 |

FOREIGN PATENT DOCUMENTS

| | | | | |
|---|---|---|---|---|
| JP | 2004240752 | * | 8/2004 | G06F 3/12 |
| JP | 3809805 | * | 8/2006 | G07F 17/26 |
| JP | 2008003991 A | | 1/2008 | |
| JP | 2009303117 | * | 12/2009 | H04N 1/00 |
| JP | 2012226533 | * | 11/2012 | G06F 13/00 |
| KR | 20090050418 | * | 5/2009 | G06F 3/14 |

\* cited by examiner

FIG.5A

LOGIN

USERNAME: Admin
PASSWORD: •••••
LOGIN DESTINATION: THIS DEVICE ▼

ENTER USERNAME AND PASSWORD, SPECIFY LOGIN DESTINATION, AND CLICK ON [LOG IN].

501 — LOG IN

SETTINGS/REGISTRATION     TO PORTAL   LOGIN USER: Admin   LOGOUT

CONFIGURATION SETTINGS
  SHEET SETTINGS
  TIMER/POWER SETTINGS
  NETWORK
  EXTERNAL INTERFACE
  VOLUME ADJUSTMENT
ADJUSTMENT/MAINTENANCE
  IMAGE QUALITY ADJUSTMENT
FUNCTION SETTINGS
  COMMON
  COPY
  PRINTER
  FILE STORAGE/ACCESS
MANAGEMENT SETTINGS
  USER MANAGEMENT
  DEVICE MANAGEMENT
  LICENSE/OTHERS — 512
  DATA MANAGEMENT
  SECURITY SETTINGS

SETTINGS/REGISTRATION: MANAGEMENT SETTINGS: LICENSE/OTHERS
MANAGEMENT SETTINGS: LICENSE/OTHERS
  FORUM/SUPPORT LINK
  SIGNAGE — 513
  REMOTE UI SETTINGS
  REGISTER/UPDATE SOFTWARE

```
SIGNAGE                                TO PORTAL   LOGIN USER: Admin   LOGOUT
SETTINGS/REGISTRATION: MANAGEMENT SETTINGS: LICENSE/OTHERS > SIGNAGE
SIGNAGE
                                                         [ OK ]  [ CANCEL ]      600

SIGNAGE
  ☑ DISPLAY SIGNAGE SCREEN                           611
      CONTENT TO BE DISPLAYED:  ● SMB
                                  FILE PATH:   \\guest_smb\share\image.jpg
  601                                            * FOR EXAMPLE: \\server01\share\signage.jpg
                           610   USERNAME:     guest              ~612
                                 PASSWORD:     •••••              ~613

620 ~○ HTTP/WebDAV
                     FILE PATH:   [                              ]
                                    * FOR EXAMPLE: https://webdav-server1/signage.html
                     USERNAME:    [                              ]
                     PASSWORD:    [                              ]
                  ☒ CHECK CERTIFICATE FOR TLS COMMUNICATION
                    ☒ ADD CN TO VERIFICATION ITEMS
  DISPLAY TIMING
      TIMING TO DISPLAY SIGNAGE IF AUTHENTICATION SCREEN IS DISPLAYED
      AT START OF OPERATION:   ● AFTER LOGIN
                               ○ AFTER AUTO CLEAR
  DISPLAY AT START OF PRINTING
      ☐ DISPLAY AT TIME OF START OF PRINT
```

FIG.7

SIGNAGE     TO PORTAL   LOGIN USER: Admin   LOGOUT

SETTINGS/REGISTRATION: MANAGEMENT SETTINGS: LICENSE/OTHERS > SIGNAGE
SIGNAGE    *661*    *662*

[ OK ]   [ CANCEL ]   *600*

SIGNAGE

☑ DISPLAY SIGNAGE SCREEN
    CONTENT TO BE DISPLAYED: ○ SMB
*601*            FILE PATH: [ \\guest_smb\share\image.jpg ]
      *610*          * FOR EXAMPLE: \\server01\share\signage.jpg
           USERNAME: [ guest ]
           PASSWORD: [ ●●●●● ]
                              *621*
   *620* ─◉ HTTP/WebDAV
           FILE PATH: [ https://guest-webdav/signage.html ]
           * FOR EXAMPLE: https://webdav-server1/signage.html
           USERNAME: [ user ] ─*622*
           PASSWORD: [ ●●●● ] ─*623*
     *624* ─☑ CHECK CERTIFICATE FOR TLS COMMUNICATION
       *625* ─☑ ADD CN TO VERIFICATION ITEMS

DISPLAY TIMING

TIMING TO DISPLAY SIGNAGE IF AUTHENTICATION SCREEN IS DISPLAYED
AT START OF OPERATION:   ◉ AFTER LOGIN ─*630*
                          ○ AFTER AUTO CLEAR

DISPLAY AT START OF PRINTING

☐ DISPLAY AT TIME OF START OF PRINT ─*640*

DISPLAY ERROR MESSAGE

☑ DISPLAY ERROR MESSAGE ─*650*

FIG.8

| Key | value |
|---|---|
| signage_settings.signage_disp | 1 |
| signage_settings.signage_protocol | 1 |
| signage_settings.signage_smb_adrs | \\guest_smb\share\image.jpg |
| signage_settings.signage_smb_user | guest |
| signage_settings.signage_smb_passwd | guest |
| signage_settings.signage_webdav_adrs | https://guest_webdav/signage.html |
| signage_settings.signage_webdav_user | user |
| signage_settings.signage_webdav_passwd | user |
| signage_settings.signage_webdav_cert | 1 |
| signage_settings.signage_webdav_cert_cn | 1 |
| signage_settings.signage_timing | 1 |
| signage_settings.signage_printing_disp | 1 |
| signage_settings.signage_err_disp | 1 |

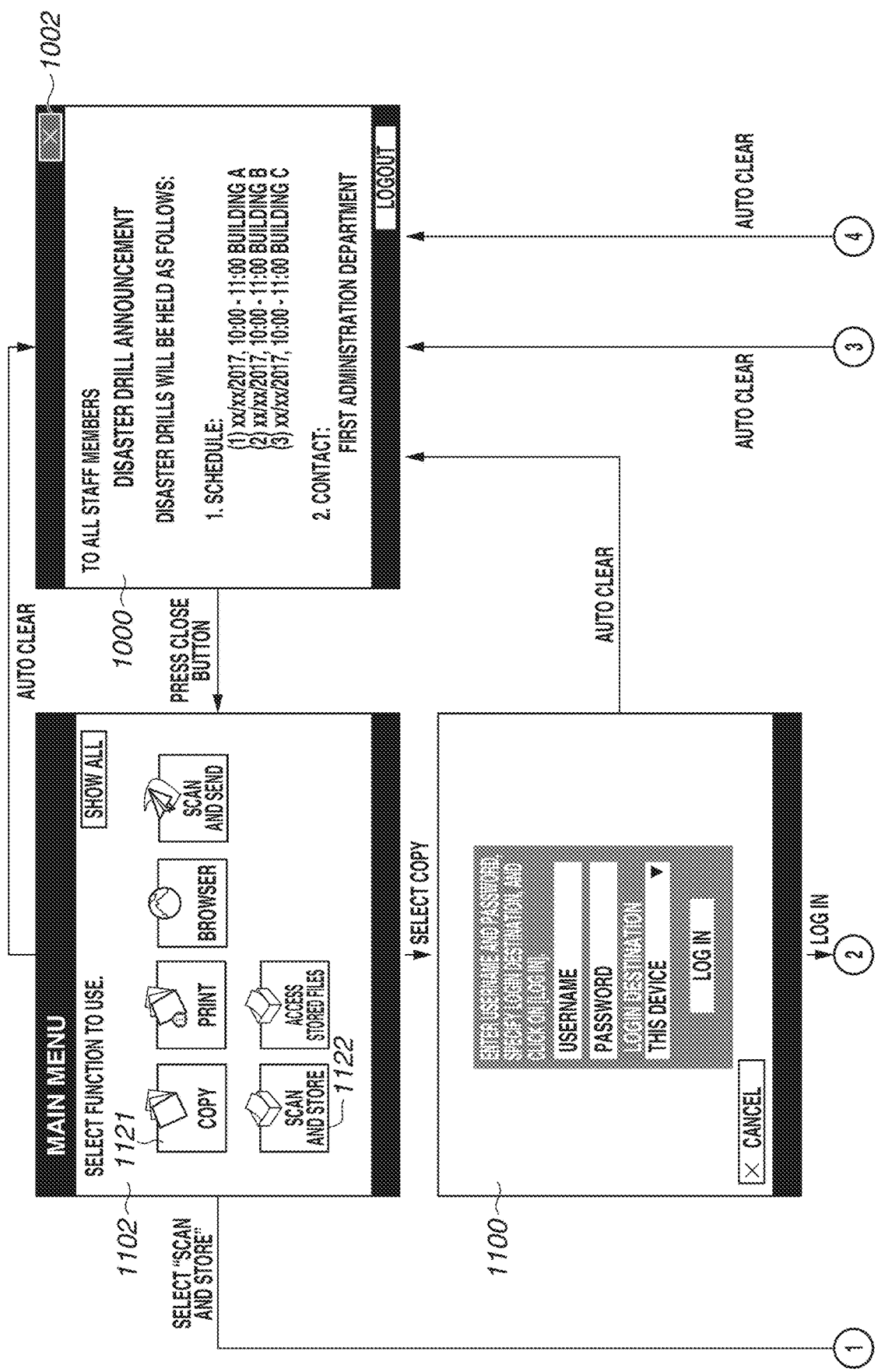

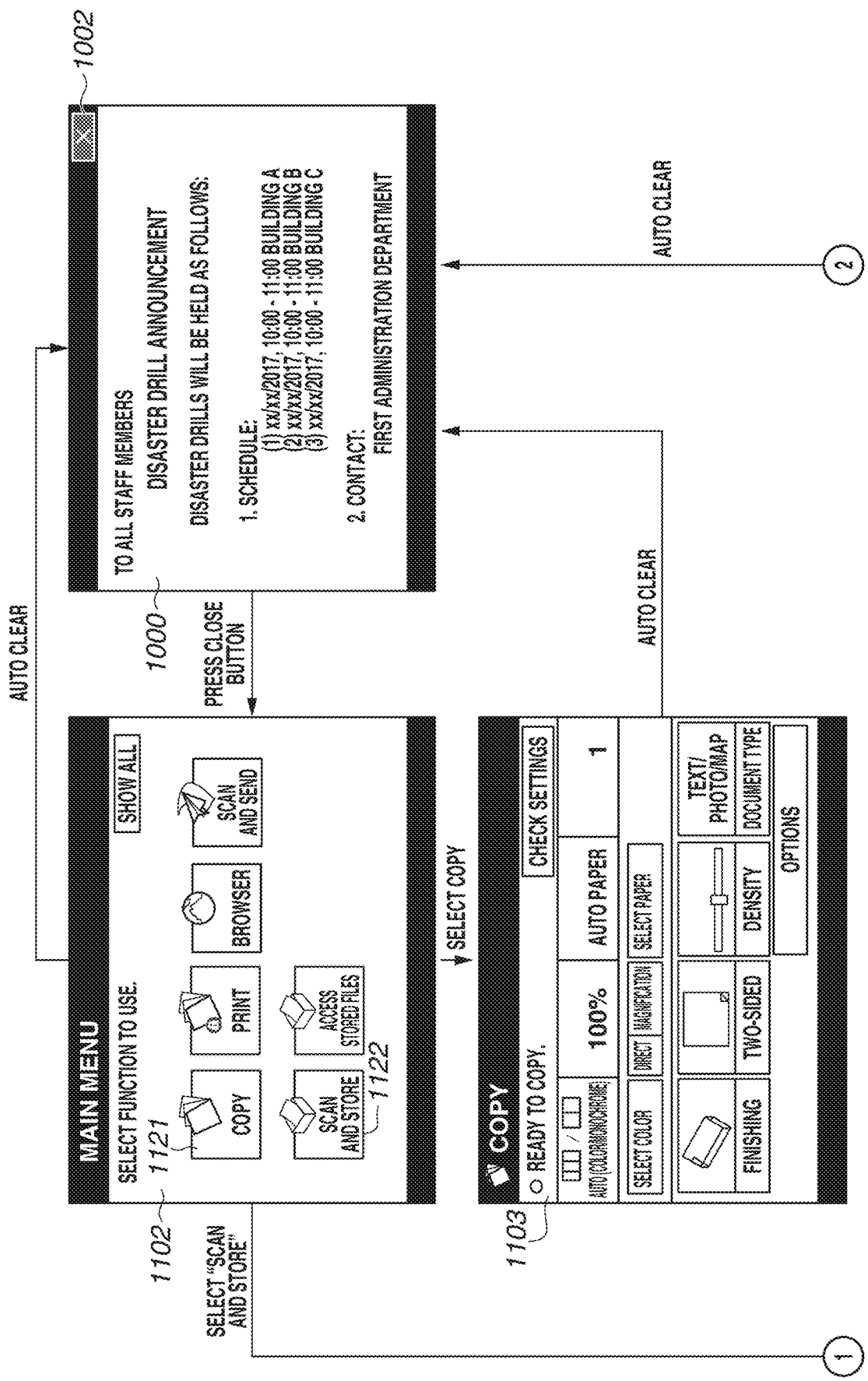

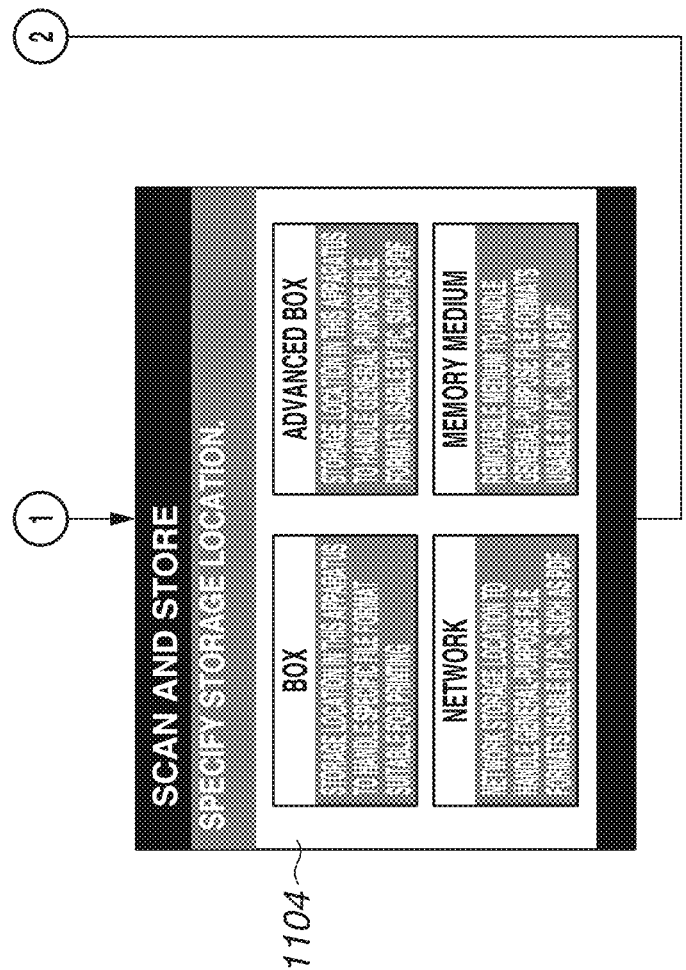

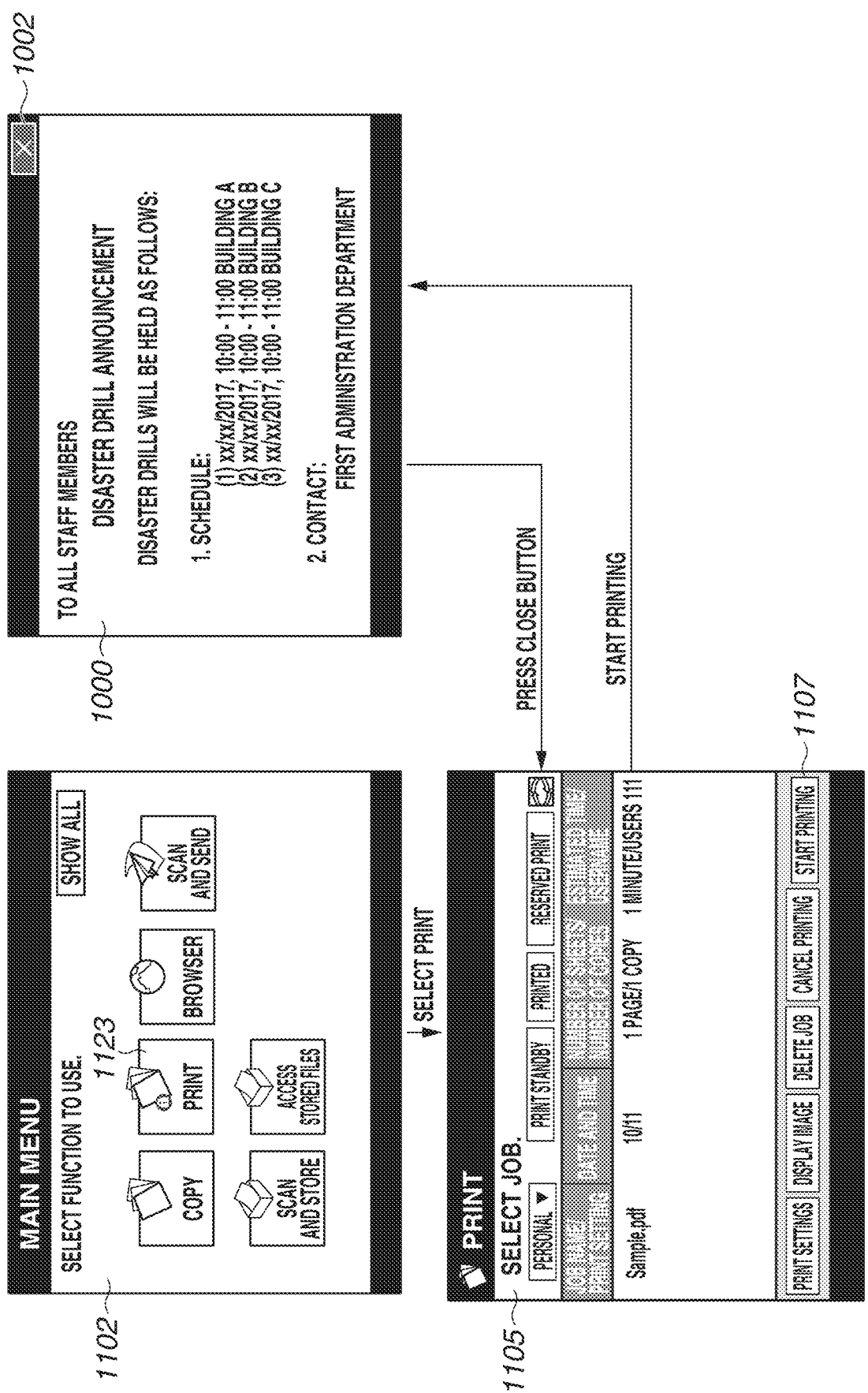

FIG.14

| | ERROR CODE | ERROR TYPE |
|---|---|---|
| 1403 | 1 | NO-FILE ERROR |
| 1404 | 2 | AUTHENTICATION ERROR |
| 1405 | 3 | COMMUNICATION ERROR |
| 1406 | 4 | SYSTEM ERROR |
| 1407 | 5 | OVERSIZED DATA ERROR |
| 1408 | 6 | INCONSISTENT FORMAT ERROR |
| 1409 | 7 | AUTO CLEAR TIME ERROR |

1401 1402 1400

*1500*

TO ALL STAFF MEMBERS

DISASTER DRILL ANNOUNCEMENT

DISASTER DRILLS WILL BE HELD AS FOLLOWS:

1. SCHEDULE:
       (1) xx/xx/2017, 10:00 - 11:00 BUILDING A
       (2) xx/xx/2017, 10:00 - 11:00 BUILDING B
       (3) xx/xx/2017, 10:00 - 11:00 BUILDING C

2. CONTACT:
       MORE DETAILS CAN BE FOUND <u>HERE</u>.   *1501*
   FIRST ADMINISTRATION DEPARTMENT

*1510*

DETAILS OF DISASTER DRILL

EVALUATION SITE ○○○○○

| | | |
|---|---|---|
| | ----- | |
| 3F | -- | |
| 2F | -- -- | |
| 1F | ---- | |

FIG.18

| SIGNAGE | TO PORTAL   LOGIN USER: Admin   LOGOUT |

SETTINGS/REGISTRATION: MANAGEMENT SETTINGS: LICENSE/OTHERS > SIGNAGE

SIGNAGE  661  662

[OK]  [CANCEL]  600

SIGNAGE

☑ DISPLAY SIGNAGE SCREEN  601

CONTENT TO BE DISPLAYED:  ○ SMB  610
FILE PATH: \\guest_smb\share\image.jpg
* FOR EXAMPLE: \\server01\share\signage.jpg
USERNAME: guest
PASSWORD: •••••

620 ● HTTP/WebDAV  621
FILE PATH: https://guest-webdav/signage.html
* FOR EXAMPLE: https://webdav-server1/signage.html
USERNAME: user  622
PASSWORD: ••••  623

624 ☑ CHECK CERTIFICATE FOR TLS COMMUNICATION
625 ☑ ADD CN TO VERIFICATION ITEMS

CONTENT TO BE PRINTED: \\guest_smb\share\print.jpg  1801
1802 ☑ PRINT DISPLAYED CONTENT

DISPLAY TIMING

TIMING TO DISPLAY SIGNAGE IF AUTHENTICATION SCREEN IS DISPLAYED
AT START OF OPERATION:  ● AFTER LOGIN  630
○ AFTER AUTO CLEAR

DISPLAY AT START OF PRINTING

☐ DISPLAY AT TIME OF START OF PRINT  640

DISPLAY ERROR MESSAGE

☑ DISPLAY ERROR MESSAGE  650

FIG.19

| Key | value |
|---|---|
| signage_settings.signage_disp | 1 |
| signage_settings.signage_protocol | 1 |
| signage_settings.signage_smb_adrs | \\guest_smb\share\image.jpg |
| signage_settings.signage_smb_user | guest |
| signage_settings.signage_smb_passwd | guest |
| signage_settings.signage_webdav_adrs | https://guest_webdav/signage.html |
| signage_settings.signage_webdav_user | user |
| signage_settings.signage_webdav_passwd | user |
| signage_settings.signage_webdav_cert | 1 |
| signage_settings.signage_webdav_cert_cn | 1 |
| signage_settings.signage_timing | 1 |
| signage_settings.signage_printing_disp | 1 |
| signage_settings.signage_err_disp | \\guest_smb\share\print.jpg |

IMAGE FORMING APPARATUS, METHOD FOR CONTROLLING SAME, AND STORAGE MEDIUM

BACKGROUND

Field of the Disclosure

The present disclosure relates to an image forming apparatus, a method for controlling the same, and a storage medium.

Description of the Related Art

Digital signage to provide information using network-connected displays at various locations including the outdoors, storefronts, public spaces, and transportation facilities is becoming widespread. The use of digital signage in corporate offices to help share information between staff members and implement corporate information control is also attracting attention.

Japanese Patent Application Laid-Open No. 2008-3991 discusses printing of a file in web content displayed on a web browser using a print function of an image forming apparatus.

Conventional digital signage techniques enable only viewing content displayed on an apparatus, and information about the displayed content is unable to be taken out for checking.

There has thus been a demand to print content information as a means for taking out the information about the displayed content. Japanese Patent Application Laid-Open No. 2008-3991 is not predicated on the display of web content as digital signage, and does not provide a means to print a file in the web content.

SUMMARY

The present disclosure describes aspects of providing an image forming apparatus that can easily print content related to content being displayed.

According to an aspect of the present disclosure, an image forming apparatus includes an acquisition unit configured to, if a predetermined event related to a user operation is received, acquire first content that has been set, a display control unit configured to control display of the acquired first content on a display unit, and a control unit configured to, if second content associated with the first content is selected in the displayed first content, control printing of the second content.

Further features of the present disclosure will become apparent from the following description of exemplary embodiments with reference to the attached drawings.

BRIEF DESCRIPTION OF THE DRAWINGS

FIGS. 5A and 5B are diagrams illustrating examples of screens displayed in setting content.

FIGS. 6A and 6B are diagrams illustrating examples of screens displayed in setting content.

FIG. 7 is a diagram illustrating an example of screen displayed in setting content.

FIG. 8 is a diagram illustrating an example of a content setting management table.

FIGS. 12A (12A-1 and 12A-2), and 12B are diagrams illustrating screen transitions.

FIG. 14 is a diagram illustrating an example of a content error management table.

FIG. 18 is a diagram illustrating an example of screen displayed in setting content.

FIG. 19 is a diagram illustrating an example of a content setting management table.

DESCRIPTION OF THE EMBODIMENTS

Figure 1:
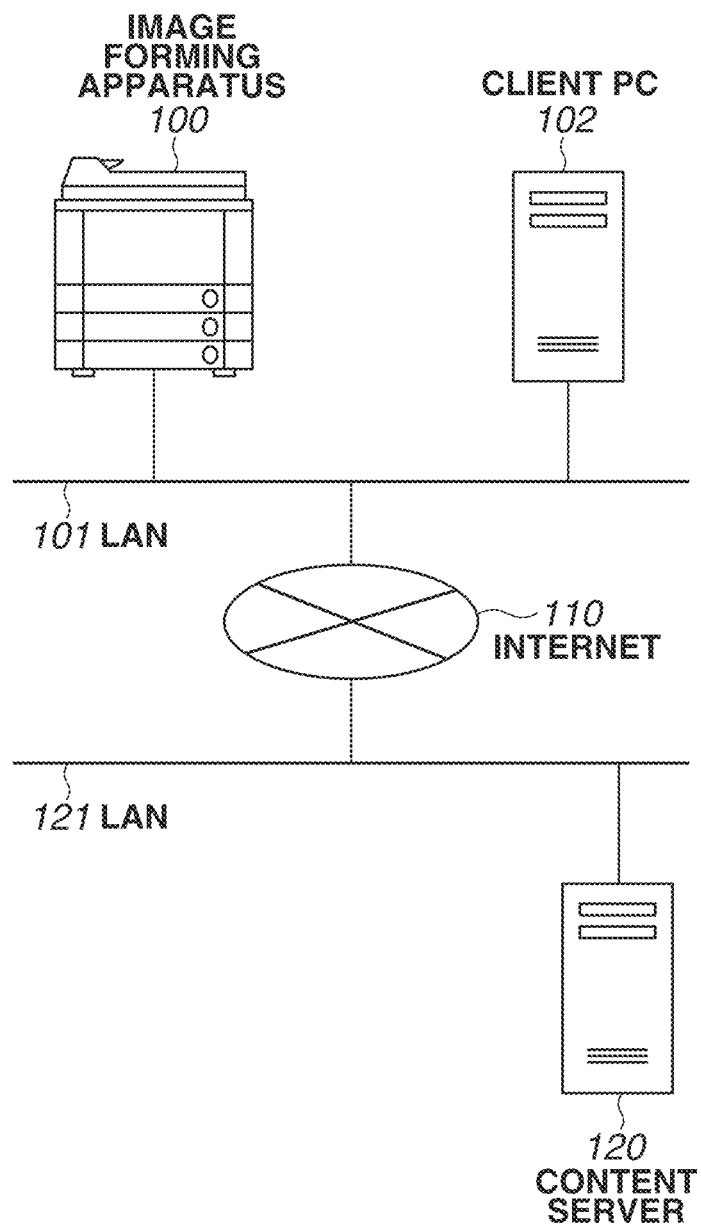
FIG. 1 is a diagram illustrating an overall configuration example of an image forming system.

Exemplary embodiments of the present disclosure will be described below with reference to the drawings. Similar components will be described with the same reference numerals.

<Overall Configuration of System>

FIG. 1 illustrates a configuration example of an image forming system according to a first exemplary embodiment. The image forming system includes an image forming apparatus 100, a client personal computer (PC) 102, and a content server 120. The image forming apparatus 100 is connected to the Internet 110 via a network 101, such as a local area network (LAN). The client PC 102 is connected to the image forming apparatus 100 via the network 101. The content server 120 is a server apparatus storing various types of content. The content server 120 is connected to the Internet 110 via a network 121, such as a LAN.

The image forming apparatus 100 can acquire content from the content server 120 via the Internet 110. In the example illustrated in FIG. 1, the image forming system includes one image forming apparatus 100, one client PC 102, and one content server 120. However, more than one of each of the apparatuses may be included. Instead of acquiring the content from the content server 120, the image forming apparatus 100 may be configured to store various types of content in a hard disk drive (HDD) 204 (FIG. 2) of the image forming apparatus 100 and display the content acquired from the HDD 204.

<Hardware Configuration of Image Forming Apparatus>

Figure 2:
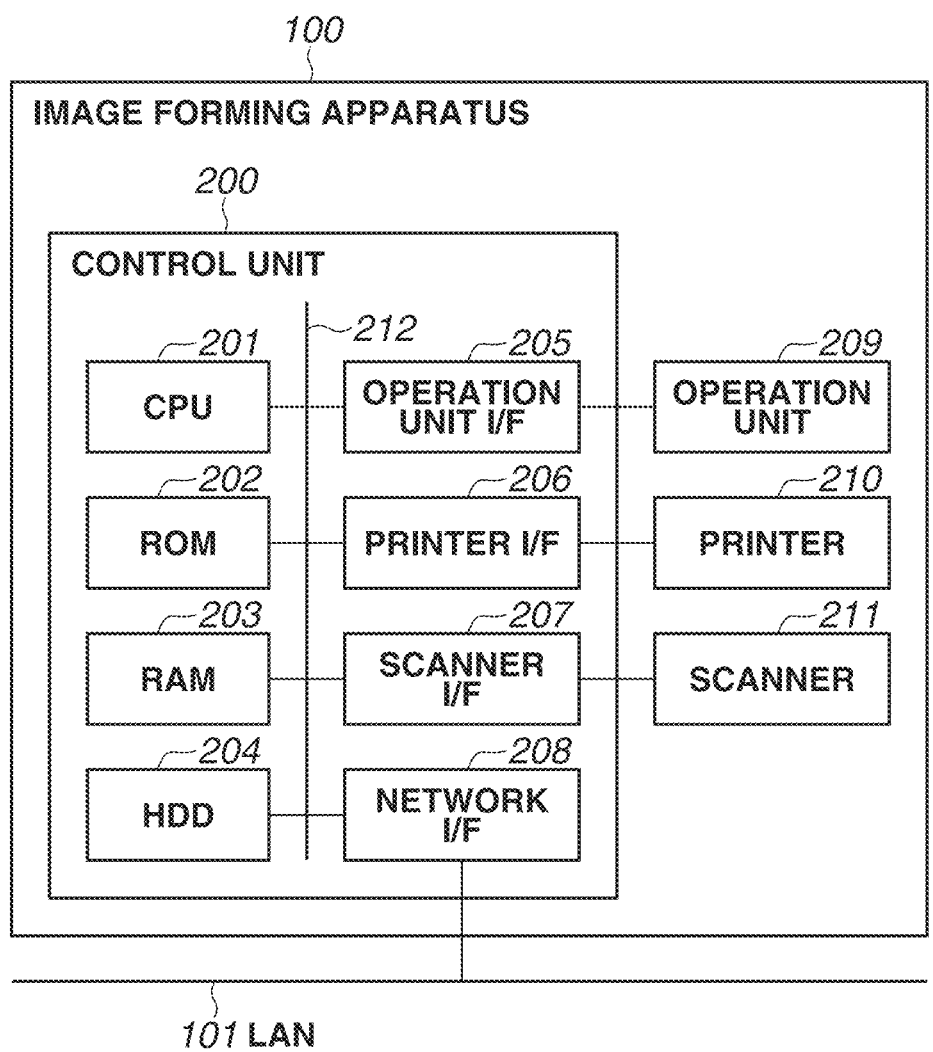
FIG. 2 is a diagram illustrating a hardware configuration example of an image forming apparatus.

FIG. 2 illustrates a hardware configuration example of the image forming apparatus 100 according to the present exemplary embodiment.

The image forming apparatus 100 includes a control unit 200, an operation unit 209, a printer 210, and a scanner 211. The control unit 200 is connected to the operation unit 209, the printer 210, and the scanner 211, and controls these units. The control unit 200 includes a central processing unit (CPU) 201, a read-only memory (ROM) 202, a random access memory (RAM) 203, the HDD 204, an operation unit interface (I/F) 205, a printer I/F 206, a scanner I/F 207, and a network I/F 208. These units are connected to each other via a system bus 212.

The CPU 201 controls the entire image forming apparatus 100. Various functions of the image forming apparatus 100 to be described below and the processing of flowcharts to be described below are implemented by the CPU 201 executing programs stored in the ROM 202 and the HDD 204. The ROM 202 stores programs, such as a system boot program. The RAM 203 is used as a main memory of the CPU 201 and a temporary storage area for various types of data. The HDD 204 stores image data, various programs, and various information tables to be described below. The HDD 204 can also store content to be displayed on the operation unit 209. In the present exemplary embodiment, the HDD 204 is an example of a storage unit.

The operation unit I/F 205 is an I/F for connecting the operation unit 209 and the control unit 200. The operation unit 209 includes a touchscreen display having the functions of both an input unit and a display unit, and a keyboard serving as an input unit. The control unit 200 outputs information to be displayed on the operation unit 209 and accepts input of operations on the operation unit 209 via the operation unit I/F 205.

The printer I/F 206 is an I/F for connecting the printer 210 and the control unit 200. The control unit 200 outputs image data to be printed to the printer 210 via the printer I/F 206. The image data transmitted from the control unit 200 is printed on a recording medium (sheet) by the printer 210.

The scanner I/F 207 is an I/F for connecting the scanner 211 and the control unit 200. The scanner 211 reads an image on a document to generate image data, and inputs the generated image data to the control unit 200 via the scanner I/F 207.

The network I/F 208 is an I/F for connecting the control unit 200 to the network 101. The control unit 200 transmits and receives information to/from external apparatuses connected to the Internet 110 via the network I/F 208.

The image forming apparatus 100 has functions, such as a copy function, a print function, a scan and send function, a scan and store function, an access stored files function, and a browser function. The copy function is a function of printing image data generated by the scanner 211 reading an image on a document on the printer 210. The print function is a function of printing image data on the printer 210 based on a print job submitted from an external apparatus, such as the client PC 102. The scan and send function is a function of transmitting image data generated by the scanner 211 reading an image on a document to an external apparatus via the network I/F 208. The scan and store function is a function of storing image data generated by the scanner 211 reading an image on a document into the HDD 204. The access stored files function is a function of printing image data stored in the HDD 204 on the printer 210 or transmitting the image data to an external apparatus via the network I/F 208. The browser function is a function of browsing, printing, and storing data on a web server (not illustrated) via a web browser.

<Software Configuration of Image Forming Apparatus>

Figure 3:
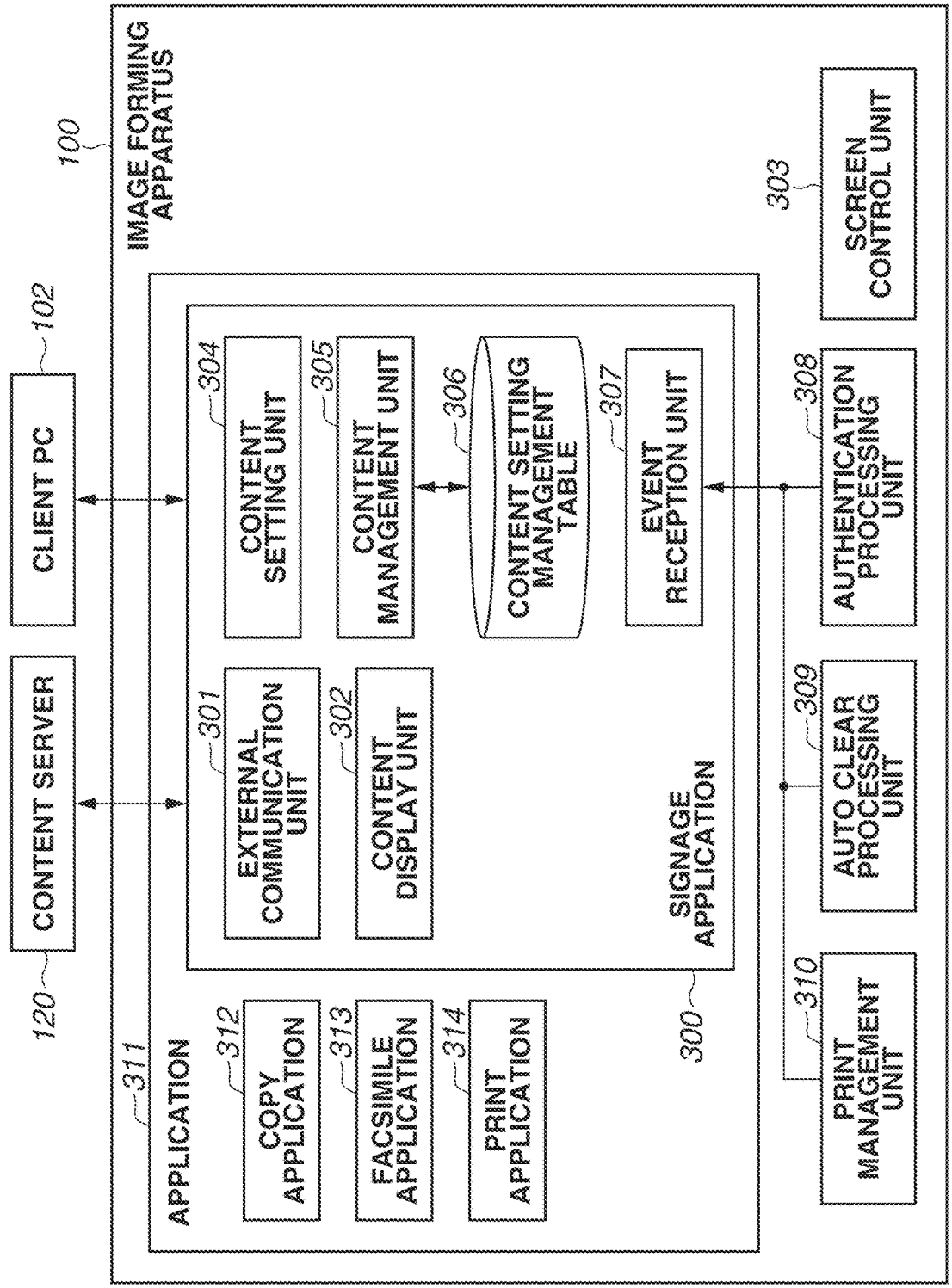
FIG. 3 is a diagram illustrating a software configuration example of an image forming apparatus.

FIG. 3 illustrates a software configuration of the image forming apparatus 100 according to the present exemplary embodiment.

As illustrated in FIG. 3, the image forming apparatus 100 includes, as software modules, an application 311, a screen control unit 303, an authentication processing unit 308, an auto clear processing unit 309, and a print management unit 310. The functions of the software modules are implemented by the CPU 201 executing programs stored in the ROM 202 or the HDD 204.

The application 311 includes, as software modules, a signage application 300, a copy application 312, a facsimile application 313, and a print application 314. The application 311 may also include not-illustrated other applications corresponding to various functions of the image forming apparatus 100 described above.

The copy application 312 is an application having a copy function. The copy application 312 performs high-speed high-quality copying by using the scanner 211 having high resolution and the printer 210 capable of high-speed printing. The copy application 312 makes a large number of copies by performing consecutive reading using the HDD 204. The copy application 312 also performs cascade copy by transmitting scanned image data to a plurality of image forming apparatuses via the network I/F 208.

The facsimile application 313 is an application having a facsimile function. The facsimile application 313 performs Group 3 (G3) and Group 4 (G4) facsimile transmission and reception, and converts received facsimile data into an email communication protocol and transfers the resulting data using a transfer function. The facsimile application 313 also performs Internet facsimile for performing facsimile transmission and reception using the Internet 110 instead of using conventional telephone lines.

The print application 314 is an application having a print function.

The print application 314 receives print data described in a page description language (PDL) from an external apparatus, such as the client PC 102, and prints the print data. The print application 314 also receives data in a Business Machine Linkage Service (BMLinkS) format that is a common format for various printers from an external apparatus, and prints the data. The print application 314 also receives application data, such as Portable Document Format (PDF) data, from an external apparatus without the intervention of a printer driver, and prints the application data.

The signage application 300 includes, as software modules, an external communication unit 301, a content display unit 302, a content setting unit 304, a content management unit 305, a content setting management table 306, and an event reception unit 307.

The external communication unit 301 communicates with the content server 120 to acquire content from the content server 120. A communication protocol the external communication unit 301 uses in communicating with the content server 120 is Server Message Block (SMB). Web-based Distributed Authoring and Versioning (WebDAV) and the Hypertext Transfer Protocol (HTTP) may also be used. Aside from the foregoing communication protocols, other communication protocols, such as an email and the File Transfer Protocol (FTP), may be used.

The content display unit 302 reads content to be displayed stored in the content server 120 or the HDD 204 into the RAM 203, and displays the read content on the operation unit 209. In the present exemplary embodiment, the content to be displayed is data in a format displayable by a web browser. Examples of the data include text data, a Hypertext Markup Language (HTML) file, an image file (e.g., Joint Photographic Experts Group (JPEG), Graphics Interchange Format (GIF), Portable Network Graphics (PNG), and bitmap (BMP) files), and a moving image file.

The content setting unit 304 sets the content to be displayed. In the present exemplary embodiment, a signage setting screen (FIG. 7) to be described below is displayed when the client PC 102 accesses a web server (not illustrated) of the image forming apparatus 100 using a web browser on the client PC 102. The content setting unit 304 sets the content to be displayed upon reception of a specific event notification, based on inputs made via the signage setting screen.

The content setting management table 306 is a management table (FIG. 8) for managing setting values of respective setting items set on the signage setting screen. The content setting management table 306 is stored in the HDD 204 of the image forming apparatus 100 or in the content server 120. The CPU 201 of the image forming apparatus 100 reads the content setting management table 306 as appropriate for use.

The content management unit 305 acquires the setting values based on keys assigned to the respective setting items of the content setting management table 306.

The event reception unit 307 receives notifications indicating the occurrence of an event (hereinafter, referred to as event notifications) from the authentication processing unit 308, the auto clear processing unit 309, and the print management unit 310. The event reception unit 307 can also receive event notifications from not-illustrated other modules.

The screen control unit 303 preforms display control on the screen displayed on the operation unit 209. Specifically, the screen control unit 303 switches display of screens managed for the respective modules of the application 311, and outputs the result to the operation unit 209.

The authentication processing unit 308 displays an authentication screen on the operation unit 209 and/or the client PC 102, and performs user authentication using authentication information, such as a user identifier (ID) and a password, input by the user via the authentication screen. If the user authentication is successful, the authentication processing unit 308 performs login processing for the user to log in to the image forming apparatus 100. If a logout instruction is given, the authentication processing unit 308 performs logout processing for the login user to log out of the image forming apparatus 100. The logout instruction is issued if a logout button displayed on the operation unit 209 is pressed by the user or auto clear processing to be described is performed. When the login processing or logout processing is performed, the authentication processing unit 308 transmits an event notification (login event or logout event) indicating the execution of the processing to the event reception unit 307. As will be described below, the authentication processing unit 308 also controls the display timing of the authentication screen based on a display setting of the authentication screen.

The auto clear processing unit 309 performs the auto clear processing if the operation unit 209 is not operated for a predetermined time (this predetermined time will hereinafter be referred to as an "auto clear transition time"). The auto clear processing is processing for clearing the setting values and setting states on the screen displayed on the operation unit 209 and restoring initial values. Suppose, for example, that the user leaves the image forming apparatus 100 while setting a copy screen for making various copy-related settings, and the auto clear transition time elapses. In such a case, the setting values being made are reset. The auto clear function can prevent the settings of the previous user from being unintentionally inherited, or settings not to be disclosed from being viewed by the next user. The auto clear processing unit 309 transmits an event notification indicating that the auto clear processing has been performed (auto clear event) to the event reception unit 307.

When the auto clear processing is performed, the authentication processing unit 308 performs the logout processing for the login user to log out. The auto clear transition time can be freely set by the user. The screen to transition to upon the auto clear processing can also be set. If an initial screen is set as the screen to transition to upon the auto clear processing, the display of the operation unit 209 is switched to the initial screen in response to the execution of the auto clear processing. The initial screen refers to a screen set by the user in advance as the screen to be displayed upon power-on.

Examples of the initial screen to be set include a main menu screen for selecting a function to be used from a plurality of functions (applications) of the image forming apparatus 100, and application screens corresponding to the respective functions. The following description deals with a case where the initial screen is set as the screen to transition to upon the auto clear processing, and the main menu screen is set as the initial screen.

The print management unit 310 performs a print job start operation. When performing the print job start operation, the print management unit 310 transmits an event notification indicating the start of the print job (print job start event) to the event reception unit 307.

The screen control unit 303, the authentication processing unit 308, the auto clear processing unit 309, and the print management unit 310 may function as common processing units and management units for the modules included in the application 311, and are mutually associated with the modules. Such units may be mutually associated with not-illustrated other functional units functioning as common processing units and management units.

<Content Setting>

Next, content setting will be described with reference to FIGS. 5A to 8. In the present exemplary embodiment, screens illustrated in FIGS. 5A to 7 are displayed on the client PC 102 under the control of the image forming apparatus 100 in setting content. If the client PC 102 accesses the web server (not illustrated) of the image forming apparatus 100 using the web browser on the client PC 102, the authentication screen is initially displayed on the client PC 102.

FIG. 5A illustrates an example of the authentication screen. If authentication information, such as a username and a password, is input to an authentication screen 500 of FIG. 5A and a login button 501 is pressed, the authentication processing unit 308 performs the user authentication and the login processing based on the input authentication information. If a user having administrator rights logs in, a system management screen for making various settings related to the image forming apparatus 100 is displayed on the client PC 102.

FIG. 5B illustrates an example of the system management screen displayed if the user having the administrator rights logs in. A system management screen 510 of FIG. 5B lists setting items on the left. If one of the setting items is selected, detailed setting items corresponding to the selected setting item are displayed on the right of the system management screen 510. FIG. 5B illustrates a state where a license/others 512 is selected. Detailed setting items related to the license/others 512 are listed on the right of the system management screen 510. If a signage 513 is selected from the detailed setting items, a setting screen of the signage application 300 illustrated in FIGS. 6A to 7 is displayed on the client PC 102.

If a user having no administrator rights logs in on the authentication screen 500 of FIG. 5A, the license/others 512 displayed on the system management screen 510 of FIG. 5B is not displayed. The setting screen of the signage application 300 is therefore not displayed on the client PC 102 of the user having no administrator rights.

As described above, the setting screen of the signage application 300 is displayed only on the client PC 102 of the user having the administrator rights. This can limit users who can set content to those having the administrator rights. While in the present exemplary embodiment the users who can set content are limited to those having the administrator rights over the entire image forming apparatus 100, general users having no administrator rights may be permitted to set content. Alternatively, an administrator right specific to the signage application 300 may be provided aside from the administrator rights over the entire image forming apparatus 100, and the users who can set content may be limited to those having that right.

FIGS. 6A to 7 illustrate examples of a signage setting screen 600 that is the setting screen of the signage application 300 according to the present exemplary embodiment. A checkbox 601 is used to switch on and off a setting to display the screen of the signage application 300. If the checkbox 601 is not checked, user interface (UI) components on the signage setting screen 600 are shaded and not enterable. If the checkbox 601 is checked, the UI components are unshaded and become enterable.

Figure 6B:
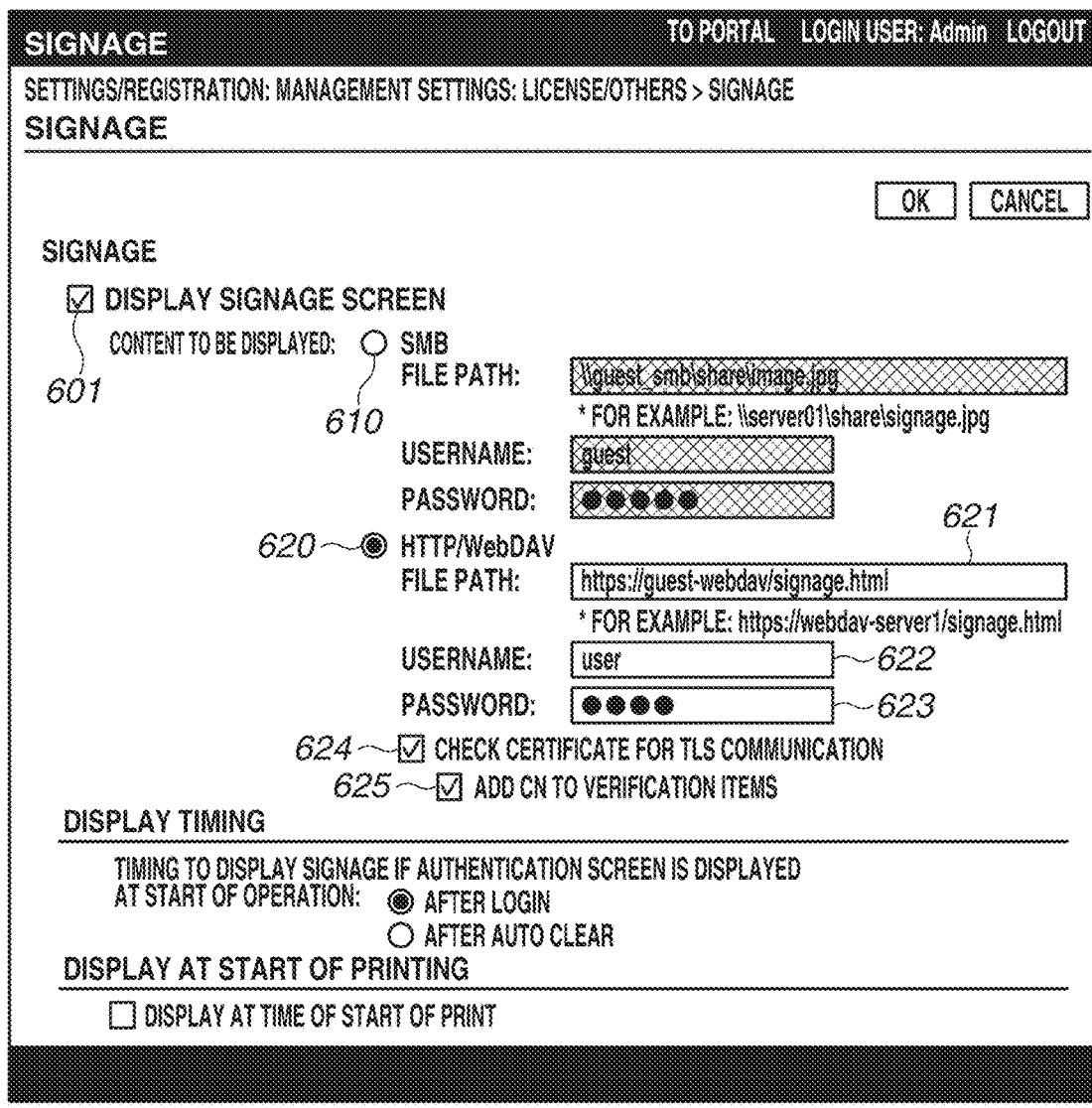

The signage setting screen 600 includes radio buttons 610 and 620. The communication protocol between the external communication unit 301 and the content server 120 can be selected by selecting either one of the radio buttons 610 and 620. If the radio button 610 for selecting SMB is selected, the setting items related to SMB are unshaded and become enterable as illustrated in FIG. 6A. If the radio button 620 for selecting the HTTP/WebDAV is selected, the setting items related to the HTTP/WebDAV are unshaded and become enterable as illustrated in FIG. 6B.

Next, the setting items related to SMB will be described with reference to FIG. 6A. FIG. 6A illustrates the signage setting screen 600 in a state where the checkbox 601 is checked and the radio button 610 is selected.

A textbox 611 is an input field for inputting a path indicating the storage location of content to be displayed if the communication protocol is set to SMB. A character string including a computer name, a folder name, and a filename delimited by \ (backslash) is input into the textbox 611 as a path. A file stored in the HDD 204 or a file stored in the content server 120 is thereby set as the content to be displayed. A textbox 612 is an input field for inputting a username to be used in accessing the content set in the textbox 611. A textbox 613 is an input field for inputting a password to be used in accessing the content set in the textbox 611.

Next, the setting items related to the HTTP/WebDAV will be described with reference to FIG. 6B. FIG. 6B illustrates the signage setting screen 600 in a state where the checkbox 601 is checked and the radio button 620 is selected.

A textbox 621 is an input field for inputting a path indicating the storage location of content to be displayed if the communication protocol is set to the HTTP/WebDAV.

A character string including a computer name, a folder name, and a filename delimited by/(slash) is input into the textbox 621 as a path. A file stored in the HDD 204 or a file stored in the content server 120 is thereby set as the content to be displayed. A textbox 622 is an input field for inputting a username to be used in accessing the content set in the textbox 621. A textbox 623 is an input field for inputting a password to be used in accessing the content set in the textbox 621.

Checkboxes 624 and 625 are used to switch settings of encrypted communication if the communication protocol is set to the HTTP/WebDAV.

Next, other setting items set on the signage setting screen 600 will be described with reference to FIG. 7. FIG. 7 is a diagram illustrating a state where the signage setting screen 600 illustrated in FIG. 6B is displayed in its entirety.

Radio buttons 630 are used to set the display timing of the content if the authentication screen is set to be displayed at the start of operation of the image forming apparatus 100. With the authentication screen set to be displayed at the start of operation of the image forming apparatus 100, whether to display the content after a login or after an auto clear is switched by selecting either one of the radio buttons 630.

A checkbox 640 is used to switch on and off a setting to display content under printing. If the checkbox 640 is checked, the content is displayed during printing.

A checkbox 650 is used to switch on and off a setting to display an error screen if an error is detected at the display timing of the content. If the checkbox 650 is checked, the error screen is displayed if an error is detected at the display timing of the content.

An OK button 661 is a button for accepting the inputs made via the signage setting screen 600. If the OK button 661 is pressed, the content setting unit 304 updates the setting values of the setting items in the content setting management table 306 with the inputs made on the signage setting screen 600. Moreover, the image forming apparatus 100 switches the display of the client PC 102 from the signage setting screen 600 to the system management screen 510.

A cancel button 662 is a button for discarding the inputs made via the signage setting screen 600. If the cancel button 662 is pressed, the inputs made via the signage setting screen 600 are discarded. The image forming apparatus 100 switches the display of the client PC 102 from the signage setting screen 600 to the system management screen 510.

In the present exemplary embodiment, the settings related to the content to be displayed on the operation unit 209 are described to be made from the client PC 102. However, the foregoing settings may be made on the operation unit 209 of the image forming apparatus 100.

FIG. 8 is a diagram illustrating an example of the content setting management table 306 according to the present exemplary embodiment.

FIG. 8 illustrates an example of the content setting management table 306 generated or updated by making inputs on the signage setting screen 600 as illustrated in FIG. 7.

A key 801 corresponds to the setting items of the signage application 300.

A setting value 802 lists the setting values corresponding to the respective setting items listed in the key 801.

A setting item 803 is an item indicating whether the setting to display the screen of the signage application 300 is ON or OFF, where 0 represents OFF and 1 represents ON. The setting value is switched by operating the checkbox 601.

A setting item 804 is an item indicating the setting of the communication protocol between the external communication unit 301 and the content server 120, where 0 represents SMB and 1 represents the HTTP/WebDAV. The setting value is switched according to the selection of the radio buttons 610 and 620.

A setting item 805 is an item indicating the setting of path information about the content to be displayed if the communication protocol is set to SMB. The path input into the textbox 611 is set in the value.

A setting item 806 is an item indicating the setting of the username used in accessing the path of the content to be displayed if the communication protocol is set to SMB. The username input into the textbox 612 is set in the value.

A setting item 807 is an item indicating the setting of the password used in accessing the path of the content to be displayed if the communication protocol is set to SMB. The password input into the textbox 613 is set in the value.

A setting item 808 is an item indicating the setting of path information about the content to be displayed if the communication protocol is set to the HTTP/WebDAV. The path input into the textbox 621 is set in the value.

A setting item 809 is an item indicating the setting of the username used in accessing the path of the content to be displayed if the communication protocol is set to the HTTP/WebDAV. The username input into the textbox 622 is set in the value.

A setting item 810 is an item indicating the setting of the password used in accessing the path of the content to be displayed if the communication protocol is set to the HTTP/WebDAV. The password input into the textbox 623 is set in the value.

Setting items 811 and 812 are items indicating the settings in performing encrypted communication if the communication protocol is set to the HTTP/WebDAV. The settings are switched by operating the checkboxes 624 and 625.

A setting item 813 is an item indicating the setting of the timing to display the content if the authentication screen is set to be displayed at the start of operation of the image forming apparatus 100. The setting is switched according to the selection of the radio buttons 630.

A setting item 814 is an item indicating whether the setting to display the content during printing is ON or OFF. The setting is switched by operating the checkbox 640.

A setting item 815 is an item indicating whether the setting to display the error screen when an error is detected is ON or OFF. The setting is switched by operating the checkbox 650.

<Display Settings of Authentication Screen>

Next, setting screens for making display settings of the authentication screen will be described with reference to FIGS. 9A to 9D. In the present exemplary embodiment, the setting screens illustrated in FIGS. 9A to 9D are displayed on the operation unit 209 or the client PC 102 under the control of the authentication processing unit 308. The setting screens illustrated in FIGS. 9A to 9D are screens that can be displayed only when the user having the administrator rights is logged in.

Figure 9A:
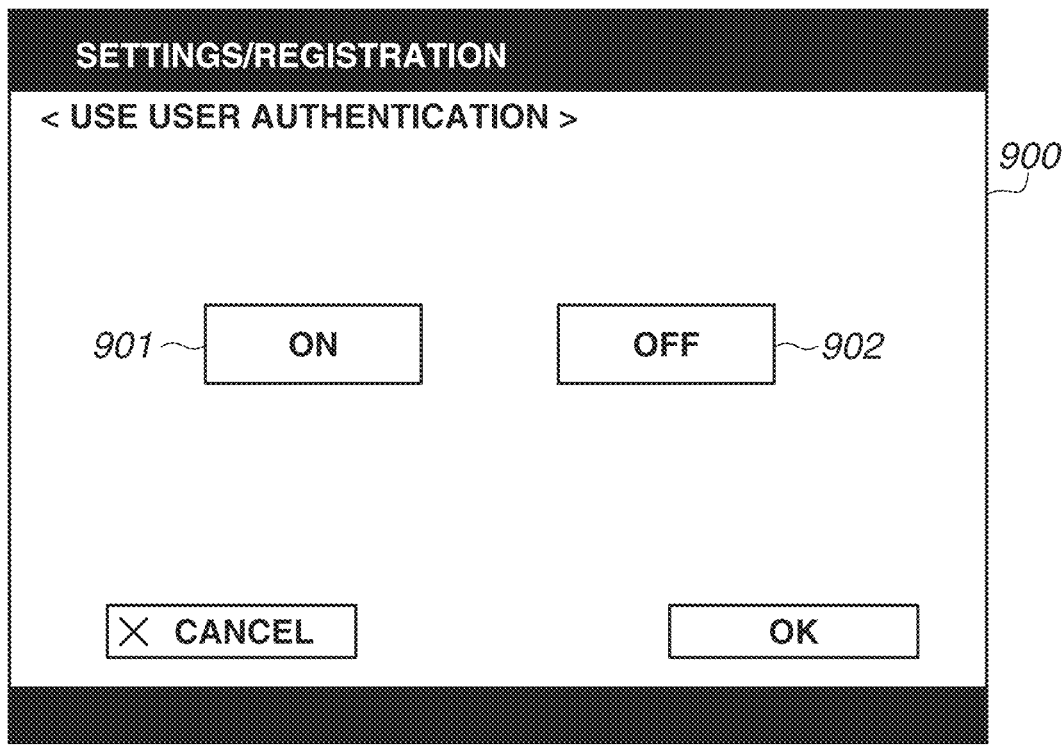
FIGS. 9A to 9D are diagrams illustrating examples of setting screens for user authentication.
Figures 1, 11A:
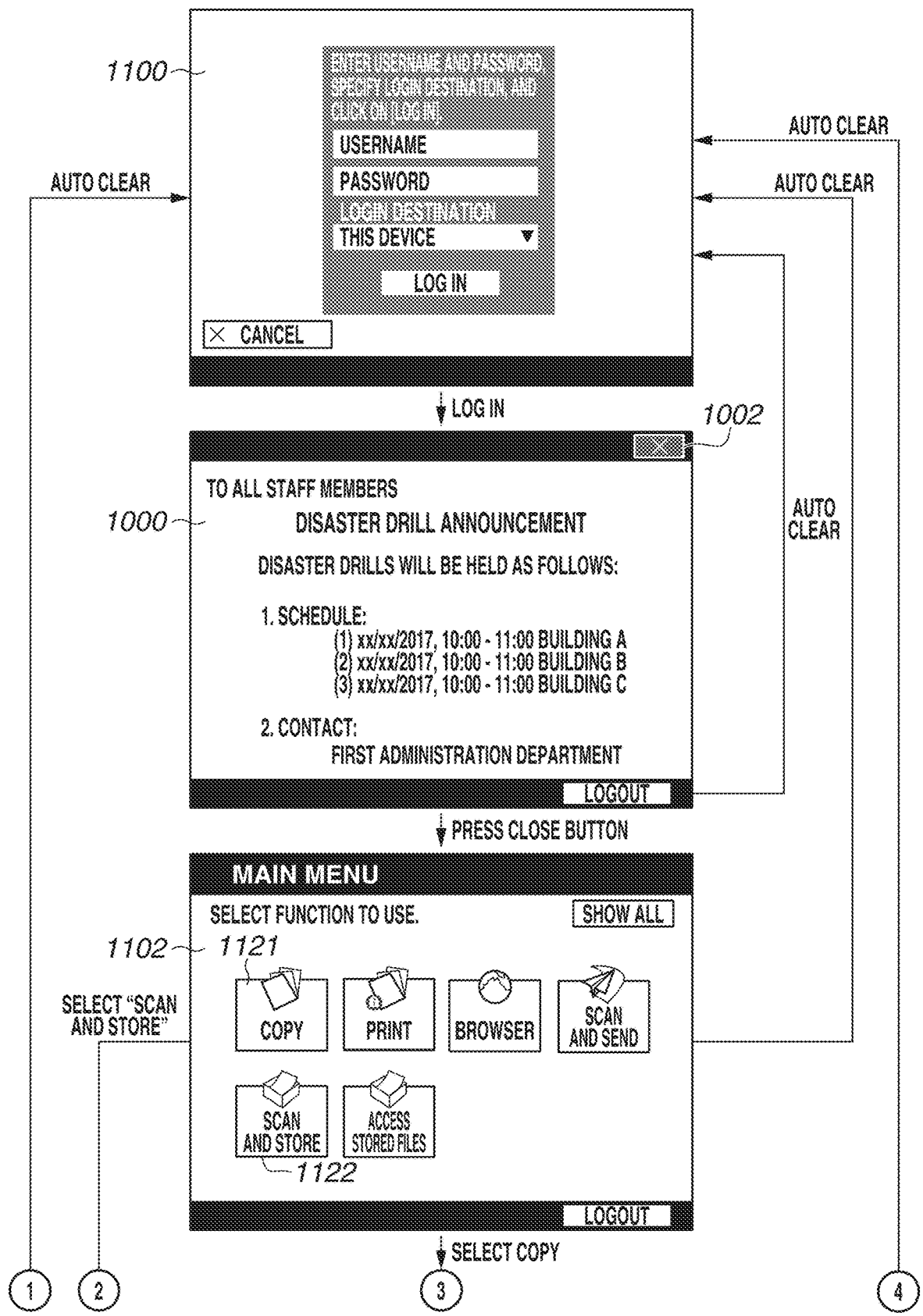
FIGS. 11A (11A-1 and 11A-2), 11B (11B-1 and 11B-2), and 11C (11C-1 and 11C-2) are diagrams illustrating screen transitions.
Figures 2, 11A:
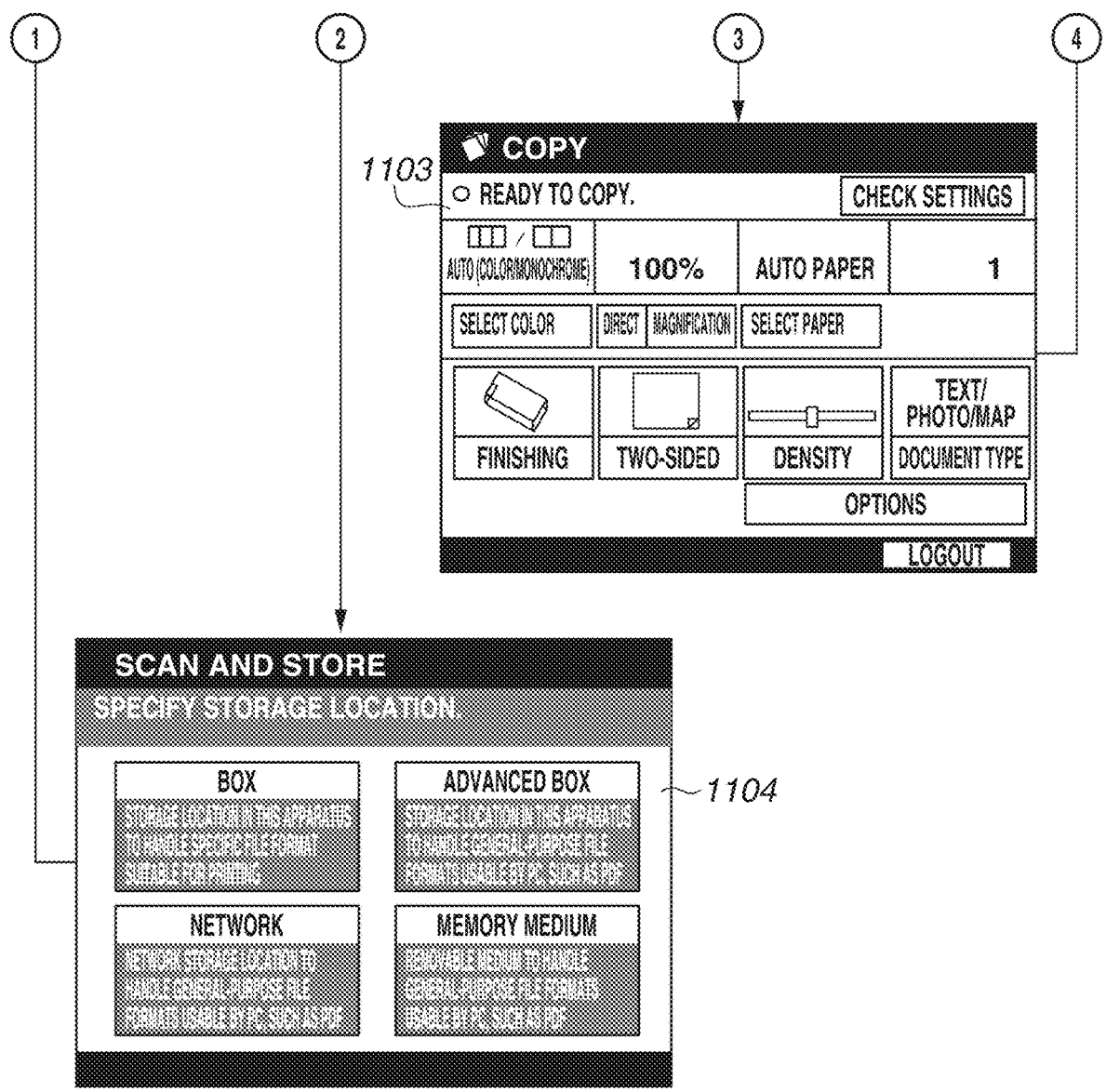

FIG. 9A illustrates a setting screen for setting whether to enable or disable the user authentication. A setting screen 900 of FIG. 9A includes an ON button 901 for enabling the user authentication and an OFF button 902 for disabling the user authentication. If the ON button 901 is selected, the user authentication is performed to use the functions of the image forming apparatus 100. In such a case, an authentication screen 1100 for inputting authentication information, illustrated in FIG. 11A (11A-1 and 11A-2), is displayed on the operation unit 209 at the display timing set on a setting screen 910 of FIG. 9B. If the OFF button 902 is selected, the user authentication is not needed to use the functions of the image forming apparatus 100, and the authentication screen 1100 illustrated in FIG. 11A is not displayed on the operation unit 209.

Figure 9B:
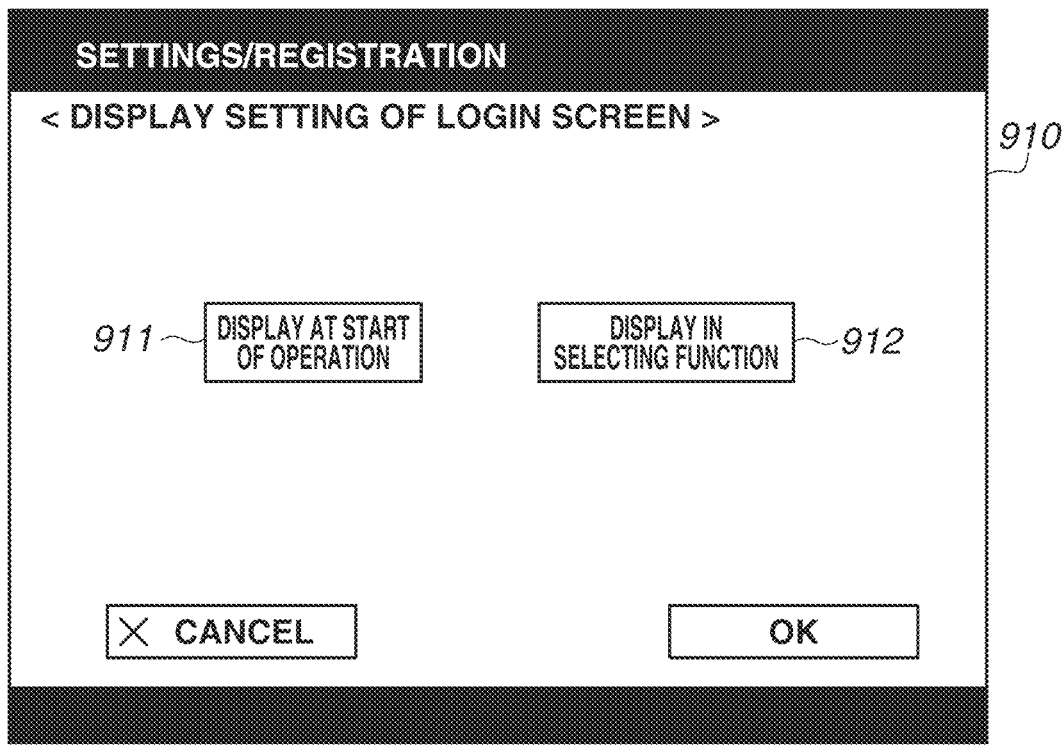
Figure 9C:
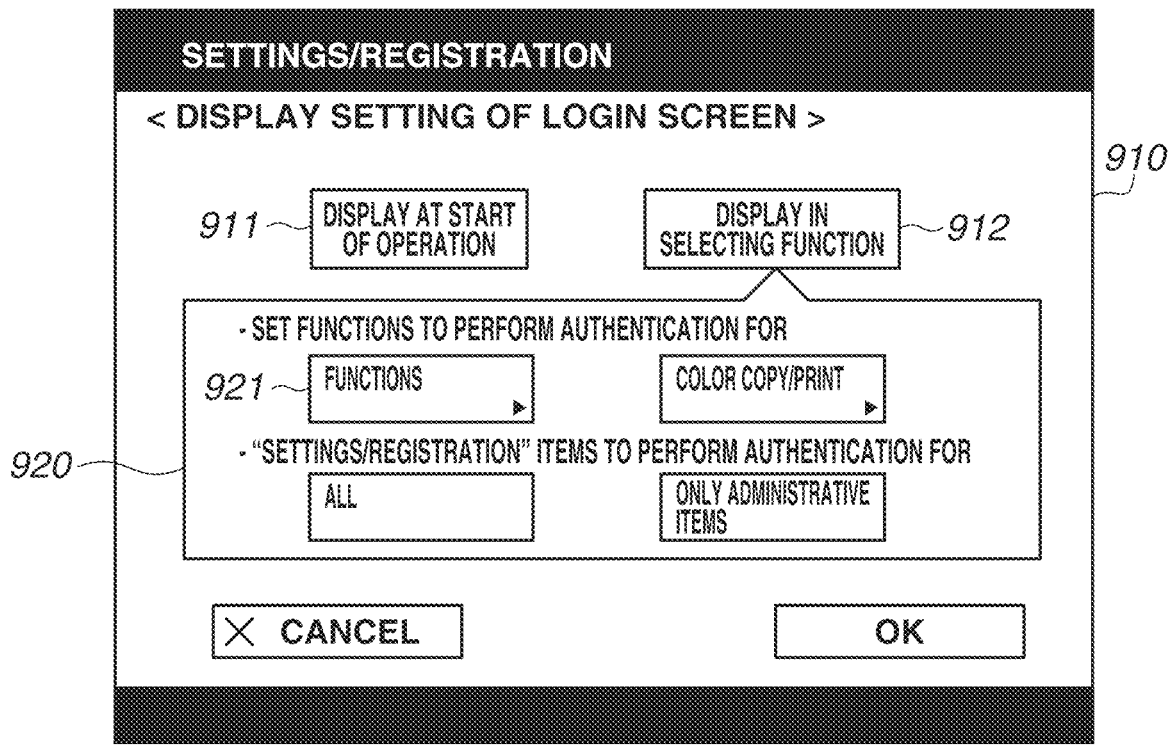

FIG. 9B illustrates a setting screen for setting the display timing of the authentication screen 1100. The setting screen 910 of FIG. 9B includes buttons 911 and 912. The button 911 is intended to make a setting to display the authentication screen at the start of operation of the image forming apparatus 100. The button 912 is intended to make a setting to display the authentication screen in selecting a specific function of the image forming apparatus 100. FIG. 9B illustrates a state where the button 911 is selected. If the button 911 is selected, the authentication screen 1100 is displayed at the start of operation of the image forming apparatus 100. In other words, if the authentication screen is set to be displayed at the start of operation, the user authentication is initially performed regardless of which function is used. If the button 912 is selected, a function selection menu 920 for selecting functions to perform the user authentication for pops up as illustrated in FIG. 9C. If a button 921 in the function selection menu 920 is selected, the display of the operation unit 209 is switched from the setting screen 910 to a setting screen 930 of FIG. 9D.

Figure 9D:
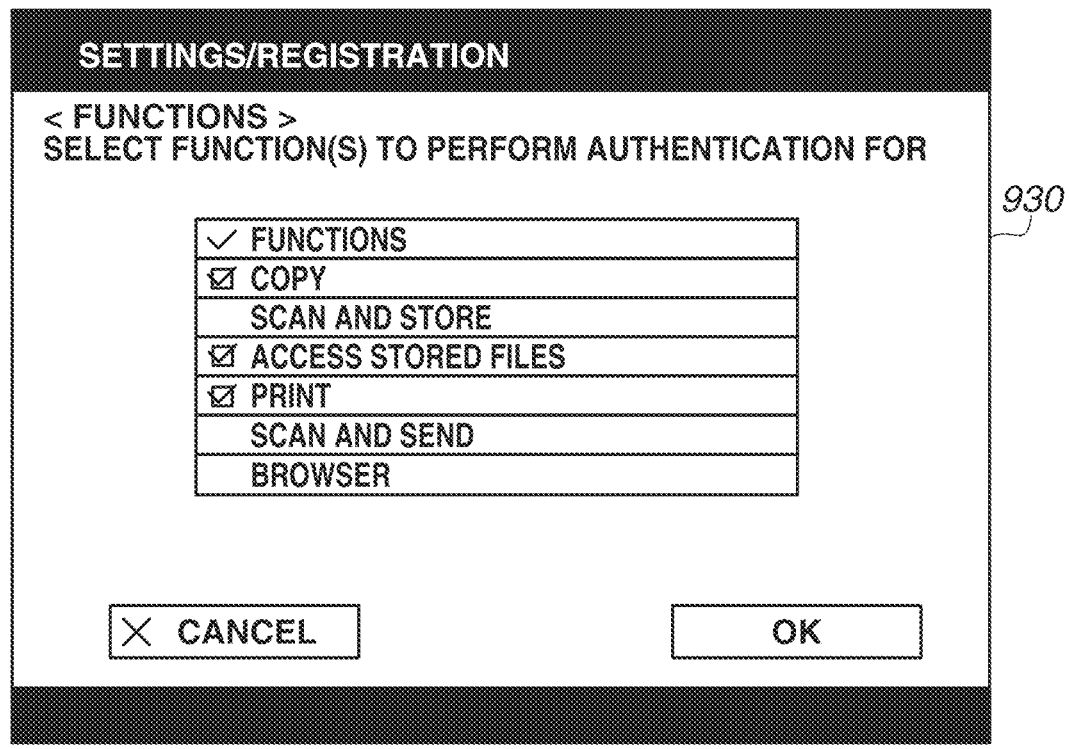

FIG. 9D illustrates a setting screen for selecting a function or functions to perform the user authentication for from the plurality of functions of the image forming apparatus 100. The image forming apparatus 100 performs the user authentication in using the function(s) selected on the setting screen 930 of FIG. 9D. In the example illustrated in FIG. 9D, the user authentication is performed in using the "copy", "access stored files", and "print" functions. On the other hand, the image forming apparatus 100 does not need the user authentication in using the function(s) not selected on the setting screen 930 of FIG. 9D. In the example illustrated in FIG. 9D, the user authentication is not needed in using the "scan and store", "scan and send", and "browser" functions.

<Display Timing of Content>

Next, the display timing of content will be described.

Figure 10:
FIG. 10 is a diagram illustrating a screen example in a state where content is displayed.

FIG. 10 illustrates a display example of content. In the present exemplary embodiment, the image forming apparatus 100 acquires an HTML file set in the textbox 621 of the signage setting screen 600 as web content 1000 from the content server 120. The image forming apparatus 100 displays the acquired web content 1000 on the operation unit 209. If the user presses a close button 1002, the image forming apparatus 100 hides the web content 1000. For example, the web content 1000 displays a disaster drill announcement as information to be notified to users who use the image forming apparatus 100. In the present exemplary embodiment, announcements to staff members are registered as content and displayed on the operation unit 209 using the signage application 300. This can help share information among the staff members and implement corporate information control.

In the present exemplary embodiment, the settings on the signage setting screen 600 and the various setting screens 900, 910, and 930 are made by the administrator of the image forming apparatus 100. The image forming apparatus 100 controls switching of the screen of the operation unit 209 based on the settings. The screen transition of the operation unit 209 based on the settings will now be described in detail.

The screen transition of the operation unit 209 in cases where the setting to display content on the operation unit 209 and the setting to perform the user authentication are made will be described with reference to FIGS. 11A to 11C (11C-1 and 11C-2). Specifically, the checkbox 601 of FIG. 7 is checked and the ON button 901 of FIG. 9A is selected here.

FIG. 11A illustrates the screen transition in a case where the setting to perform the user authentication at the start of operation of the image forming apparatus 100 and the setting to display the content after a login are made. Specifically, in this case, the button 911 of FIG. 9B is selected and the setting of the display timing is switched to display the content after a login by using the radio buttons 630 of FIG. 7.

The authentication screen 1100 is initially displayed on the operation unit 209. The image forming apparatus 100 then performs the user authentication using the authentication information input on the authentication screen 1100, and if the user authentication is successful, performs the login processing. After the login processing, the image forming apparatus 100 acquires the web content 1000 from the content server 120 and displays the acquired web content 1000 on the operation unit 209. If the close button 1002 on the web content 1000 is pressed, the image forming apparatus 100 displays the main menu screen 1102 that is the initial screen on the operation unit 209. If the user presses any of the function buttons on the main menu screen 1102, the image forming apparatus 100 displays a screen corresponding to the selected function button on the operation unit 209. For example, if a function button 1121 corresponding to the copy function is selected, the image forming apparatus 100 displays an application screen 1103 for making copy-related settings on the operation unit 209. If a function button 1122 corresponding to the scan and store function is selected, the image forming apparatus 100 displays a setting screen 1104 for making settings related to the scan and store function on the operation unit 209. In contrast, if the auto clear transition time has elapsed without the user operating the operation unit 209, the image forming apparatus 100 performs the auto clear processing. The image forming apparatus 100 then performs the logout processing, and switches the display of the operation unit 209 to the authentication screen 1100.

As described above, with the settings of FIG. 11A, the web content 1000 is displayed to the user succeeded in user authentication when the user starts operating the image forming apparatus 100. This can successfully attract the user's attention to effectively inform the user of the company announcement, for example.

Figures 1, 11B:
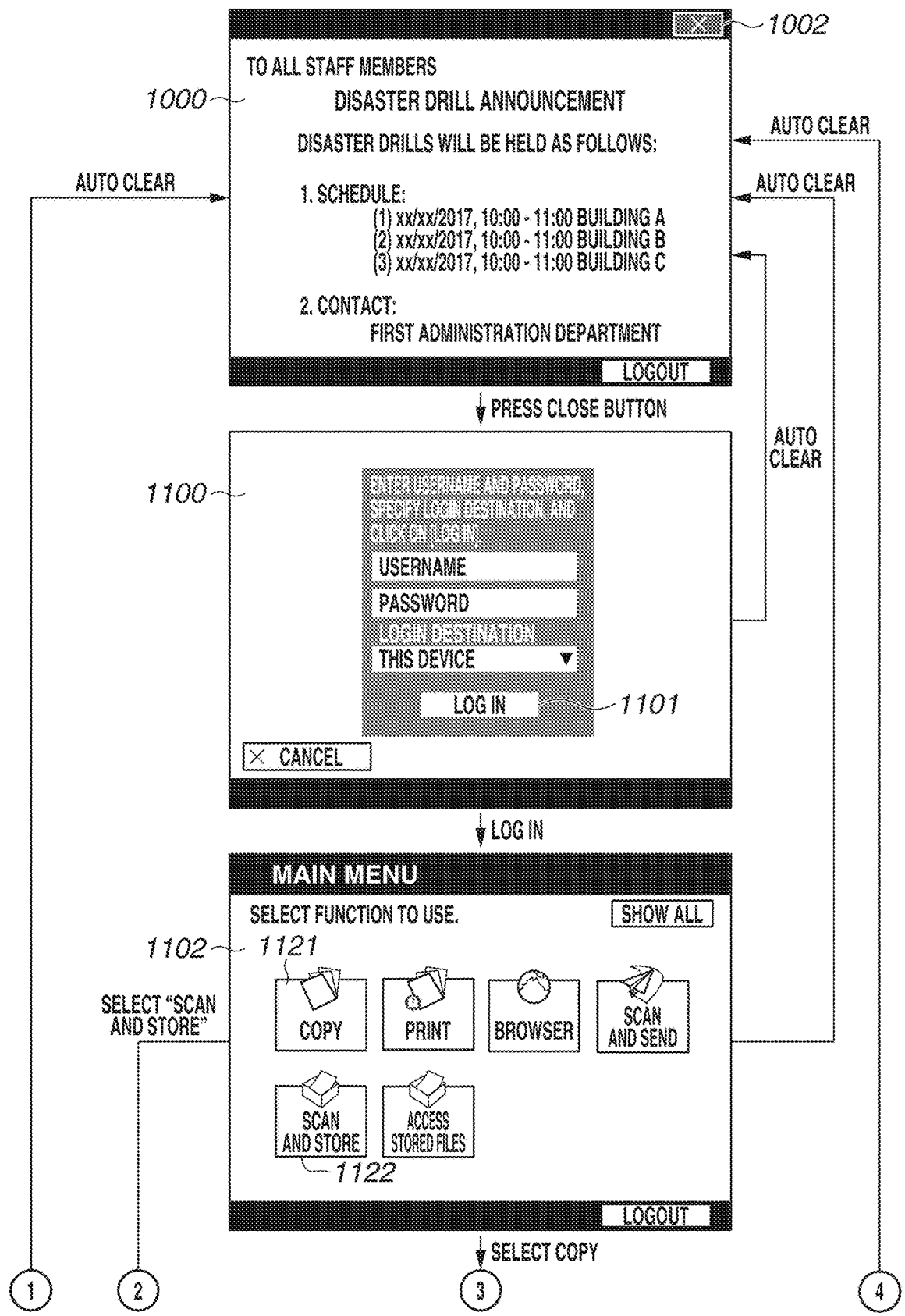
Figures 2, 11B:
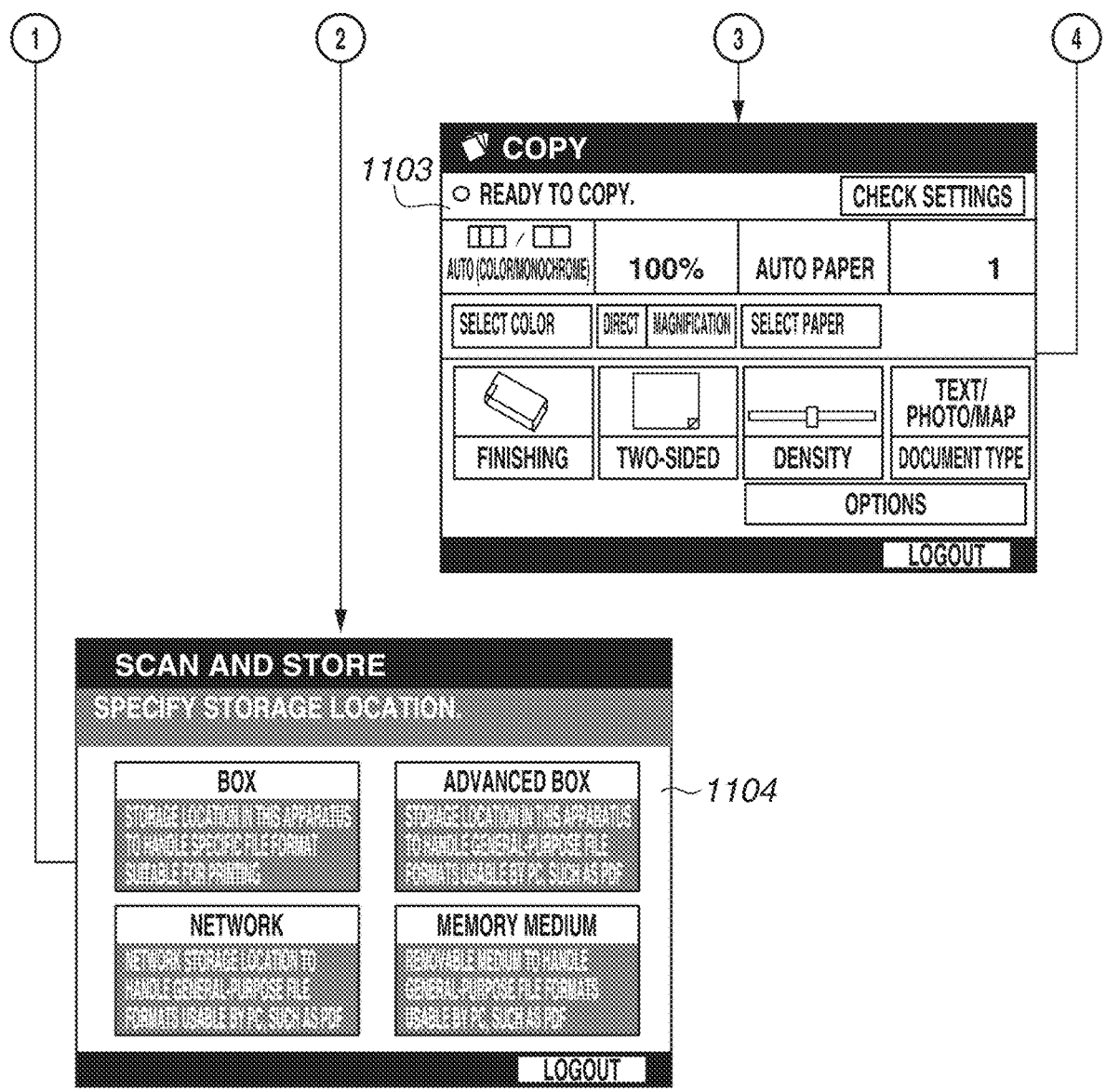

FIG. 11B (11B-1 and 11B-2) illustrates the screen transition in a case where the setting to perform the user authentication at the start of operation of the image forming apparatus 100 and the setting to display the content after an auto clear are made. Specifically, in this case, the button 911 of FIG. 9B is selected and the setting of the display timing is switched to display the content after an auto clear by using the radio buttons 630 of FIG. 7.

FIG. 11B is different from FIG. 11A mainly in that the image forming apparatus 100, if the auto clear transition time has elapsed and the auto clear processing is performed, displays the web content 1000 on the operation unit 209 instead of the authentication screen 1100. If the close button 1002 is pressed on the web content 1000, the image forming apparatus 100 displays the authentication screen 1100 on the operation unit 209. Then, if the login processing is performed, the image forming apparatus 100 switches the display of the operation unit 209 to the main menu screen 1102 that is the initial screen.

As described above, with the settings of FIG. 11B, the web content 1000 is displayed after an auto clear.

The web content 1000 is thus displayed before the user operates the image forming apparatus 100. This increases the opportunities for the web content 1000 to be noticed even by users who are not intended to operate the image forming apparatus 100 but simply passing in front of the image forming apparatus 100, and improves the advertising function.

Figures 2, 11C:
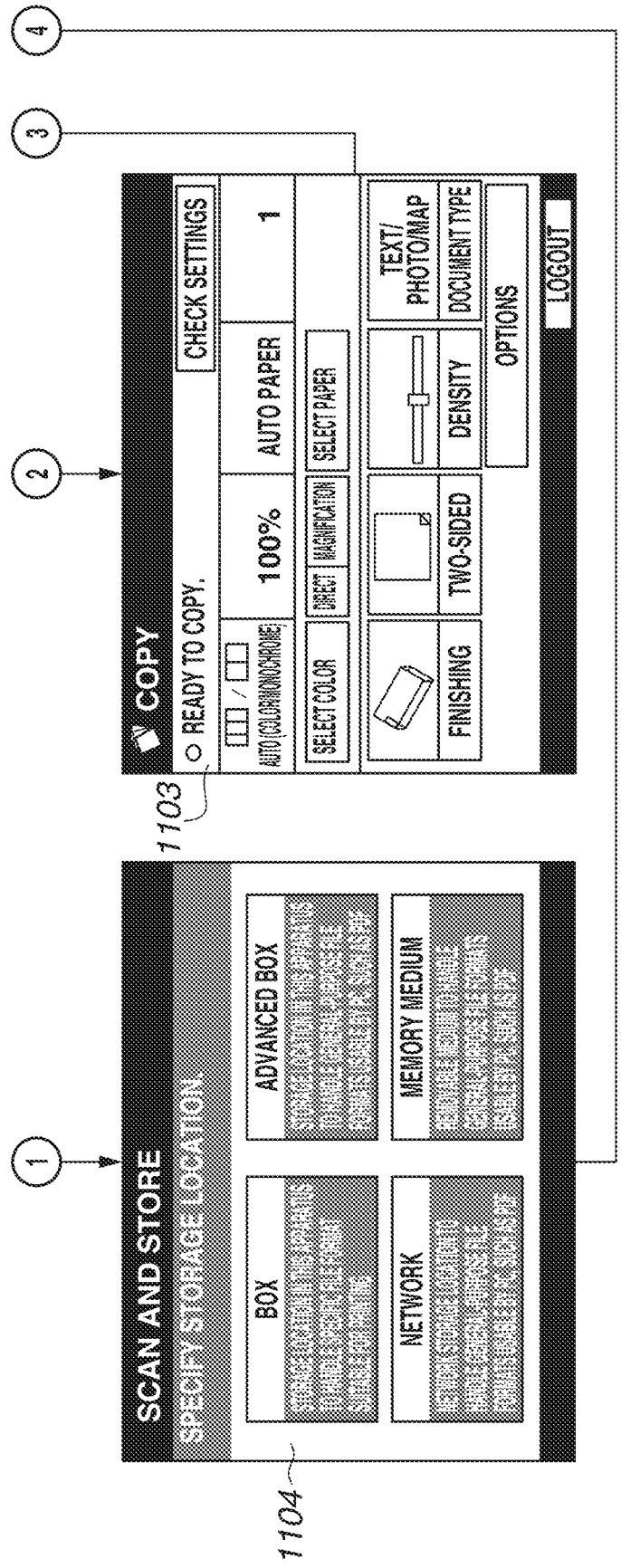

FIG. 11C illustrates the screen transition in a case where the setting to perform the user authentication in selecting a specific function of the image forming apparatus 100 and the setting to display the content after an auto clear are made. Specifically, in this case, the button 912 of FIG. 9B is selected and the setting of the display timing is switched to display the content after an auto clear by using the radio buttons 630 of FIG. 7. Suppose also that the "copy", "access stored files", and "print" functions are selected as the functions to perform the user authentication for as illustrated in FIG. 9D.

FIG. 11C is different from FIG. 11B mainly in that the image forming apparatus 100, if the close button 1002 on the web content 1000 is pressed, displays the main menu screen 1102 that is the initial screen on the operation unit 209 instead of the authentication screen 1100. If the user presses a function button corresponding to a function to perform the user authentication for on the main menu screen 1102, the image forming apparatus 100 displays the authentication screen 1100 on the operation unit 209. For example, if the function button 1121 corresponding to the copy function is selected, the image forming apparatus 100 displays the authentication screen 1100 on the operation unit 209. If the user inputs authentication information and the user authentication is successful, the image forming apparatus 100 displays the application screen 1103 for making the copy-related settings on the operation unit 209. In contrast, if the function button 1122 corresponding to the scan and store function is selected, the image forming apparatus 100 displays the setting screen 1104 for making the settings related to the scan and store function on the operation unit 209 without displaying the authentication screen 1100.

As described above, with the settings of FIG. 11C, if the authentication screen 1100 is set to be displayed in selecting a specific function, the web content 1000 is not displayed after the user login but after an auto clear. If the web content 1000 were set to be displayed after a login as with the setting of FIG. 11A and the specific function were selected, the web content would be displayed. In contrast, if a function other than the specific one were selected, the web content 1000 would not be displayed. This could reduce the opportunities for users who, for example, frequently use the scan and store function but not the copy function to see the web content 1000. By contrast, the setting to display the web content 1000 after an auto clear enables the image forming apparatus 100 on standby to be used as a signage display device regardless of the functions used. Company announcements can thereby be made widely known to users.

Next, the screen transition of the operation unit 209 in a case where the screen display of the signage application 300 is set to ON and a setting not to perform the user authentication is made will be described with reference to FIG. 12A (12A-1 and 12A-2). Specifically, in this case, the checkbox 601 of FIG. 7 is checked and the OFF button 902 of FIG. 9A is selected.

With the settings of FIG. 12A, the image forming apparatus 100 displays the web content 1000 after an auto clear as in FIG. 11C, but does not display authentication screen 1100 at the start of operation or when a function is selected. The image forming apparatus 100 can thus be effectively used as a signage display device as is the case with FIG. 11C.

Next, the screen transition in a case where the content is set to be displayed during printing will be described with reference to FIG. 12B. Specifically, in this case, the checkbox 640 of FIG. 7 is checked.

The user initially selects a function button 1123 corresponding to the print function on the main menu screen 1102. The image forming apparatus 100 displays an application screen 1105 for making settings related to the print function. If the user selects a print start button 1107 on the application screen 1105, the image forming apparatus 100 displays the web content 1000 on the operation unit 209. Then, if the printing is completed or the close button 1002 is pressed on the web content 1000, the image forming apparatus 100 switches the display of the operation unit 209 from the web content 1000 to the application screen 1105. Now, suppose that the checkbox 640 of FIG. 7 is not checked. In such a case, the image forming apparatus 100 does not display the web content 1000 on the operation unit 209 even if the print start button 1107 is selected on the application screen 1105. If an instruction to start a print job is accepted without displaying the application screen 1105, the image forming apparatus 100 does not display the web content 1000 on the operation unit 209, either.

<Display of Error Screen>

Figure 13:
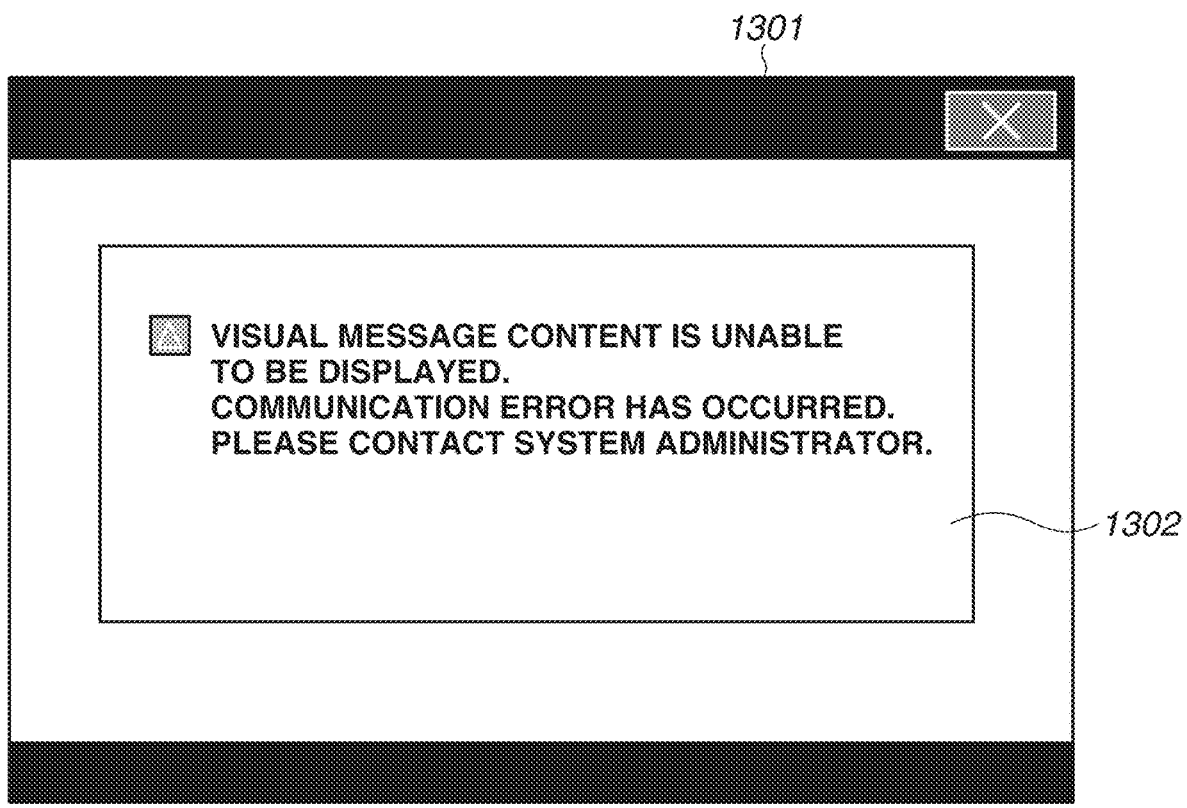
FIG. 13 is a diagram illustrating an example of an error screen.

FIG. 13 illustrates a display example of the error screen displayed on the operation unit 209 if an error is detected at the display timing of the content. An error screen 1301 displays an error message 1302 describing details of the detected error. For example, FIG. 13 illustrates an error message for notifying of a "communication error" when a communication error is detected. The error type is not limited thereto. The error screen 1301 displays error messages 1302 corresponding to a plurality of error types to be described with reference to FIG. 14.

FIG. 14 is a diagram illustrating an example of an error management table 1400 for managing errors occurring in displaying the content. The error management table 1400 may be stored in the HDD 204 of the image forming apparatus 100 or in the content server 120.

An error code 1401 lists numbers (error codes) for identifying the types of error detected.

An error type 1402 lists error types corresponding to the error codes.

An error item 1403 is an item indicating a "no-file error" resulting from a failure in acquiring the content due to reasons, such as the absence of the content in the set path, when acquiring the content.

An error item 1404 is an item indicating an "authentication error" resulting from a failure of authentication performed based on the inputs to the textboxes 612 and 613 if a setting to perform authentication for the path input into the textbox 611 of the signage setting screen 600 is made.

The error item 1404 also indicates an "authentication error" resulting from a failure of authentication performed based on the inputs to the textboxes 622 and 623 if a setting to perform authentication for the path input into the textbox 621 is made.

An error item 1405 is an item indicating a "communication error" resulting from a failure in acquiring the content due to a network fault when acquiring the content.

An error item 1406 is an item indicating a "system error" resulting from a failure of the image forming apparatus 100 other than the errors corresponding to the error items 1403 to 1405 or error items 1407 to 1409.

The error item 1407 is an item indicating an "oversized data error" resulting from a data size exceeding a predetermined upper limit value in acquiring the content.

The error item 1408 is an item indicating an "inconsistent format error" resulting from the acquired content lacking a format displayable by the content display unit 302.

The error item 1409 is an item indicating an "auto clear time error" resulting from a failure of content display after an auto clear due to the setting of the auto clear transition time.

<Screen Transition in Printing Content>

Figure 15:
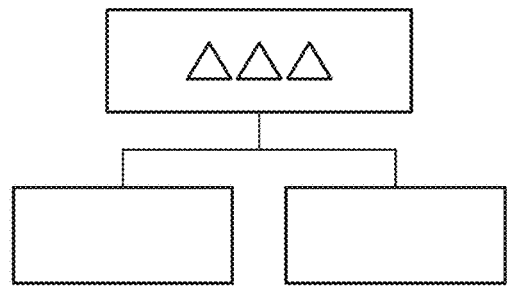
FIG. 15 illustrates diagrams of screen examples in a state where content is displayed.

FIG. 15 illustrates a display example of the web content. Unlike the web content 1000 illustrated in FIG. 10, web content 1500 illustrated in FIG. 15 includes a hyperlink 1501. In the present exemplary embodiment, the web content 1500 is an example of first content.

The hyperlink 1501 includes embedded information specifying linked content. In the present exemplary embodiment, the linked content is content to be printed 1510.

If the user selects the hyperlink 1501, the image forming apparatus 100 prints the content to be printed 1510. In the present exemplary embodiment, the content to be printed 1510 is an example of second content. The web content 1500 includes link information indicating the storage location of the content to be printed 1510, and the content to be printed 1510 is associated with the web content 1500.

Next, the screen transition of the operation unit 209 in a case where the web content 1500 is acquired will now be described.

Figure 17A:
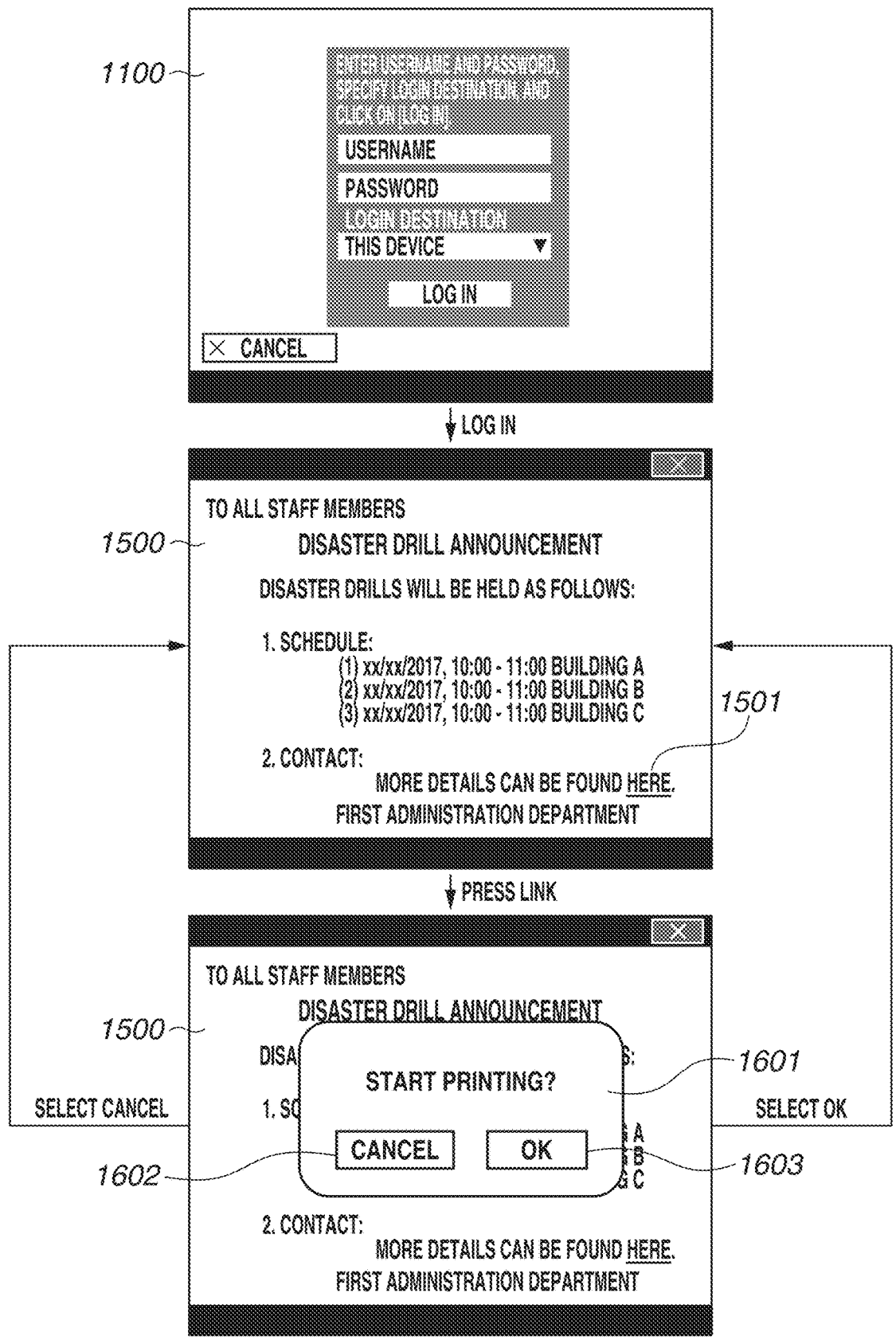
FIGS. 17A and 17B (17B-1 and 17B-2) are diagrams illustrating screen transitions according to the first exemplary embodiment.

FIG. 17A illustrates the screen transition in a case where the same settings as with FIG. 11A are made.

The authentication screen 1100 is initially displayed on the operation unit 209. If the image forming apparatus 100 performs the user authentication using authentication information input on the authentication screen 1100 and the user authentication is successful, the image forming apparatus 100 performs the login processing. After the login processing, the image forming apparatus 100 acquires the web content 1500 from the content server 120 and displays the acquired web content 1500 on the operation unit 209. If the hyperlink 1501 in the web content 1500 is selected, the image forming apparatus 100 displays a print dialog on the web content 1500.

Figure 16:
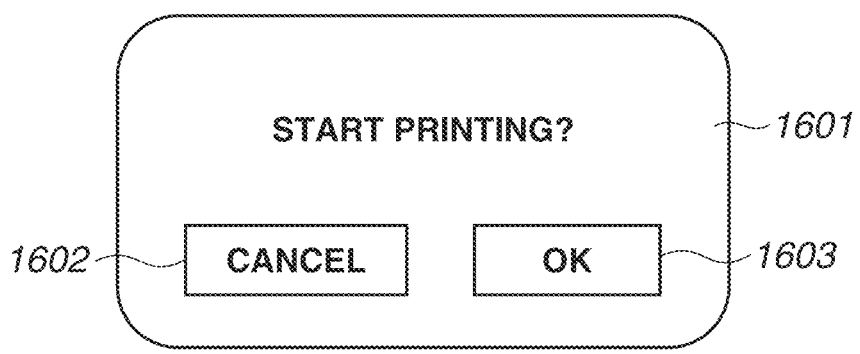
FIG. 16 is a diagram illustrating an example of a print dialog.

FIG. 16 illustrates an example of the print dialog. A print dialog 1601 includes an OK button 1603 serving as an instruction button for issuing an instruction to perform printing, and a cancel button 1602 for cancelling printing. The image forming apparatus 100 starts to download the content to be printed 1510 at the same time as the display of the print dialog, and stores the content to be printed 1510 in the HDD 204. Here, the content to be printed 1510 is assumed to be, but not limited to, a file in the PDF format. If the user presses the OK button 1603 on the print dialog 1601, the image forming apparatus 100 prints the content to be printed 1510 and hides the print dialog 1601. In contrast, if the user presses the cancel button 1602 on the print dialog 1601, the image forming apparatus 100 cancels printing and hides the print dialog 1601.

Figures 1, 17B:
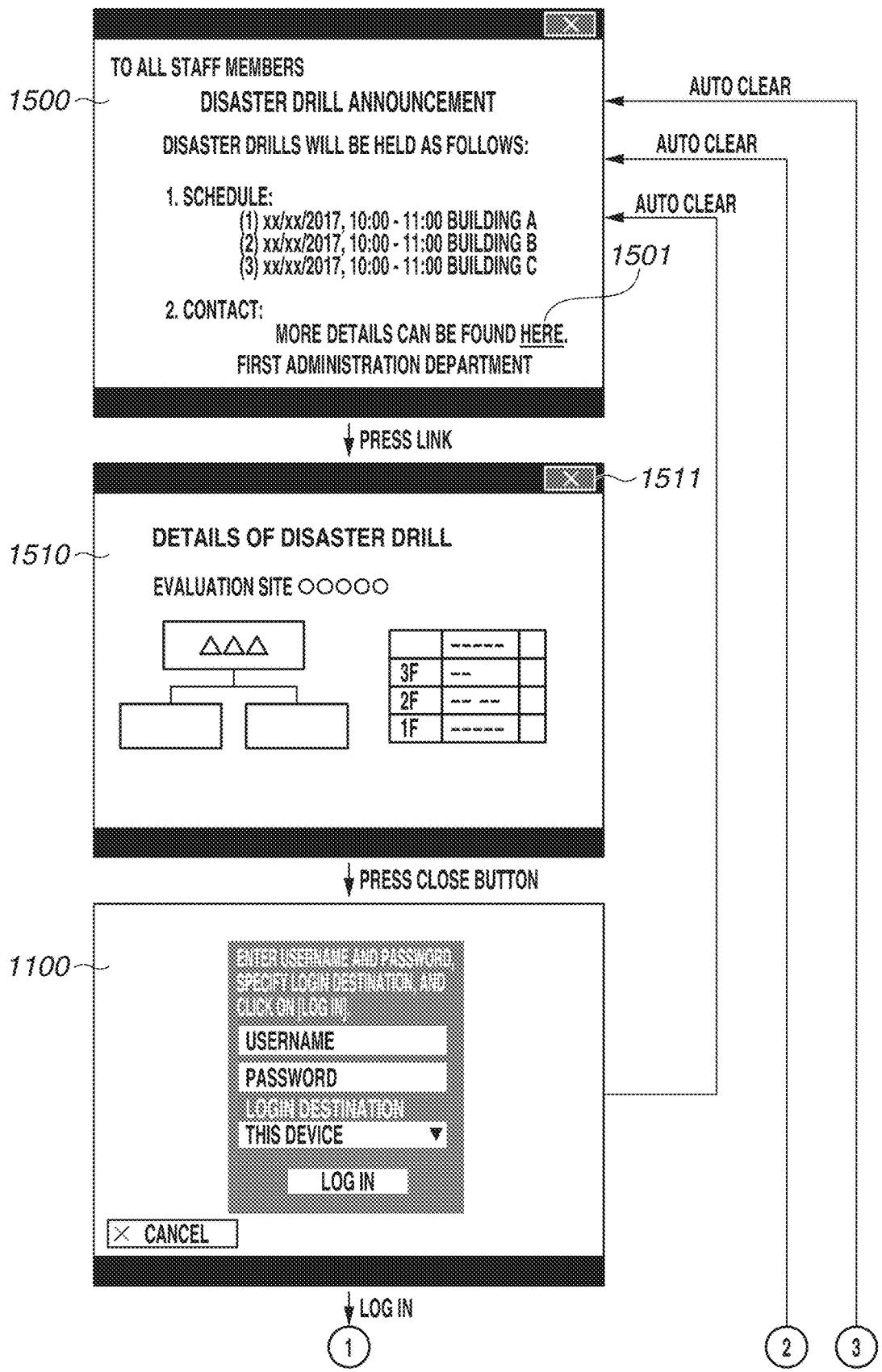
Figures 2, 17B:
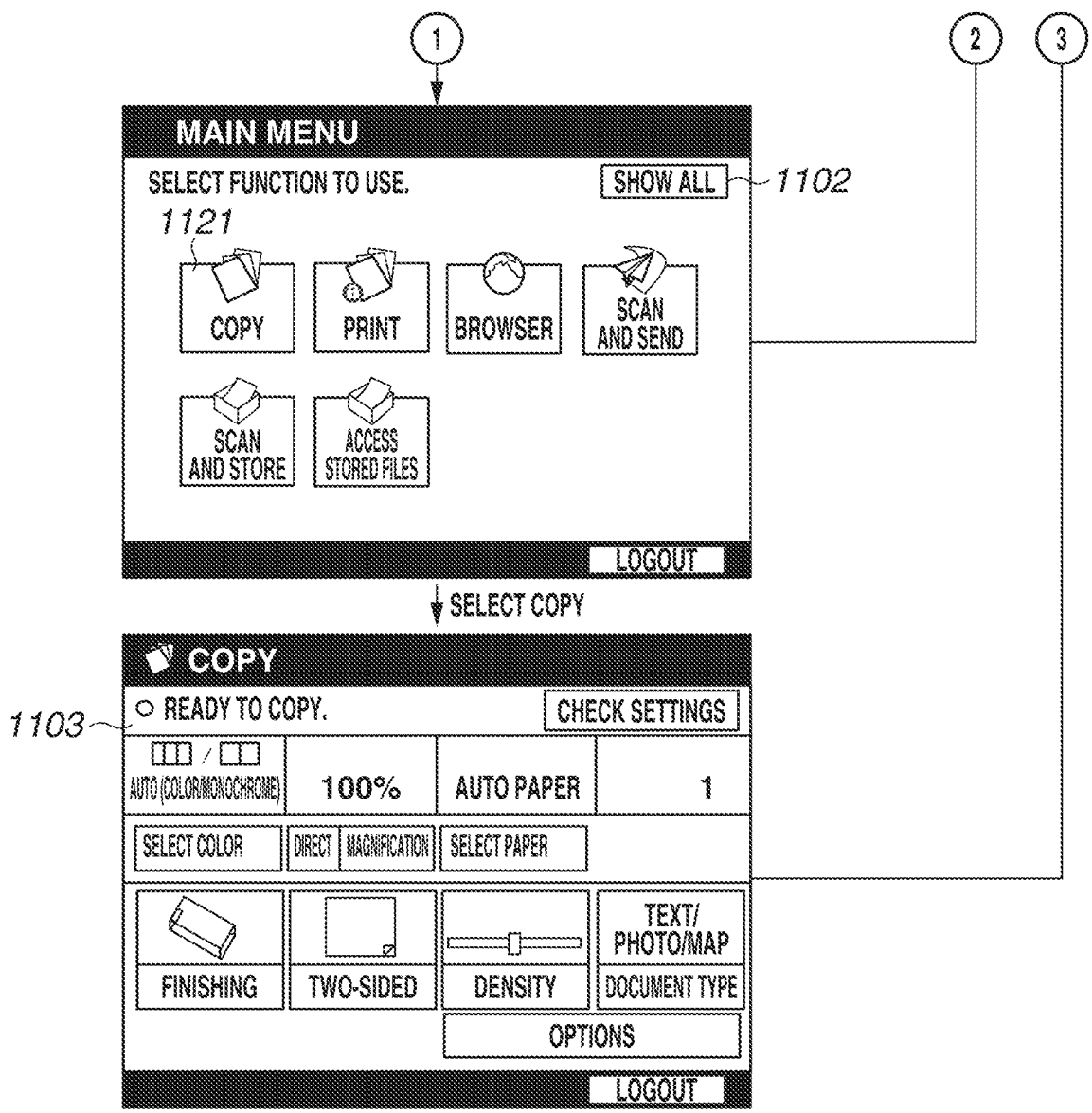

FIG. 17B (17B-1 and 17B-2) illustrates the screen transition in a case where the same settings as with FIG. 11B are made.

In FIG. 17B, if the auto clear transition time has elapsed and the auto clear processing is performed, the image forming apparatus 100 displays the web content 1500 on the operation unit 209. If the hyperlink 1501 in the web content 1500 is selected, the image forming apparatus 100 displays the content to be printed 1510 on the operation unit 209. In FIG. 17B, the hyperlink 1501 is pressed in an unauthenticated state before authentication, and the image forming apparatus 100 does not print the content to be printed 1510. If a close button 1511 on the content to be printed 1510 is then pressed, the image forming apparatus 100 displays the authentication screen 1100 on the operation unit 209. If the signage application 300 detects an error when the hyperlink 1501 is selected, the image forming apparatus 100 displays the error screen 1301 of FIG. 13 on the operation unit 209 instead of the content to be printed 1510.

<Content Print Processing>

Figure 4A:
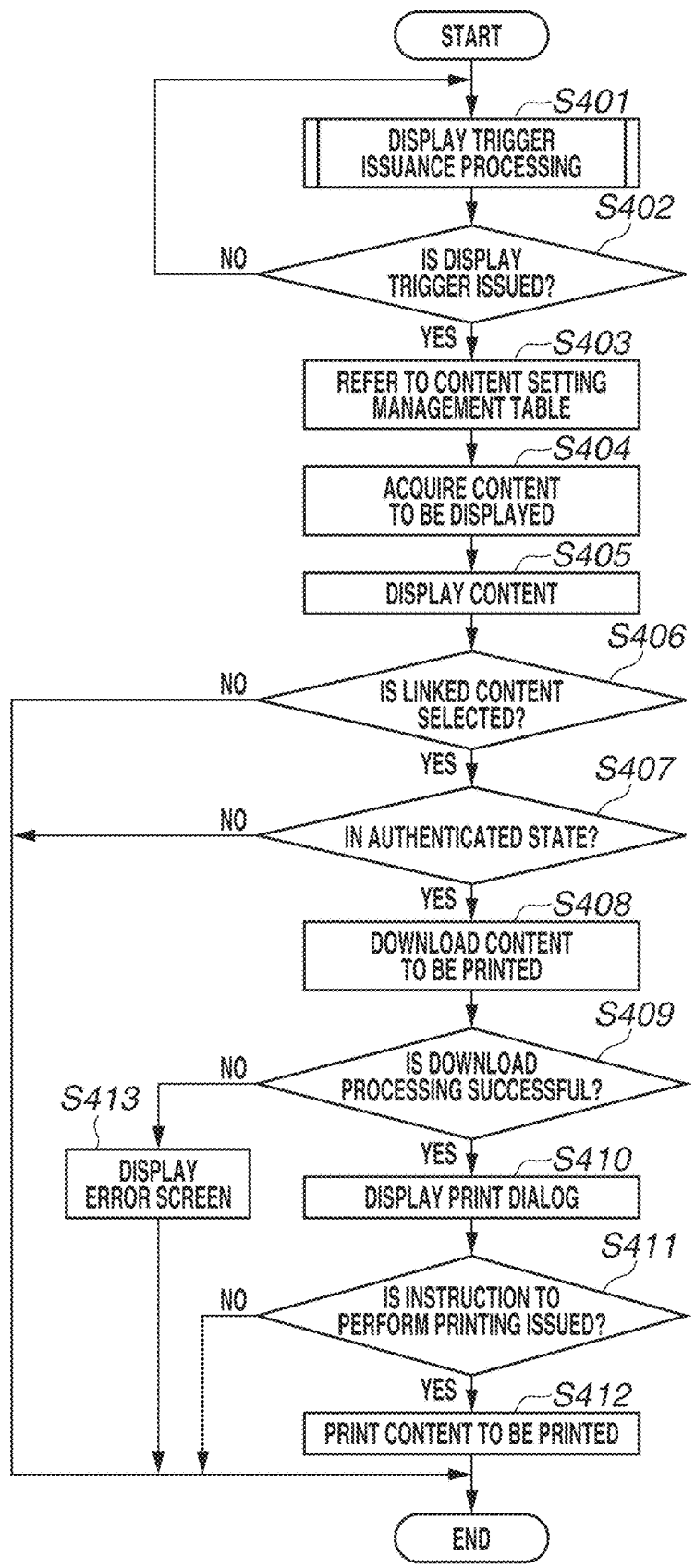
FIG. 4A is a flowchart illustrating content print processing according to a first exemplary embodiment.

FIG. 4A is a flowchart illustrating content print processing performed by the image forming apparatus 100 according to the present exemplary embodiment. The processing of this flowchart is regularly performed after the image forming apparatus 100 is powered on, for example.

Figures 1, 4B:
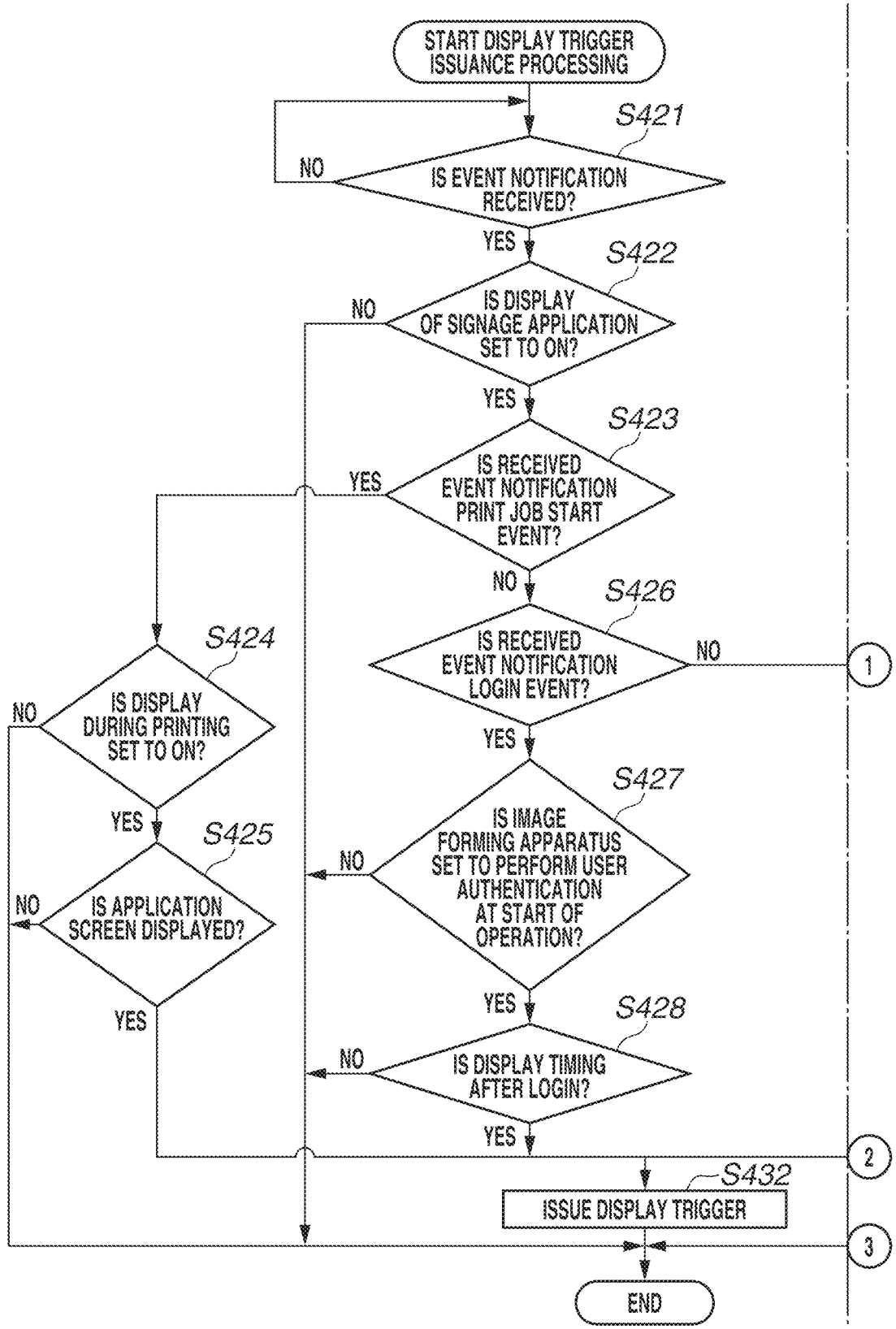
FIG. 4B (4B-1 and 4B-2) is a flowchart illustrating display trigger issuance processing.
Figures 2, 4B:
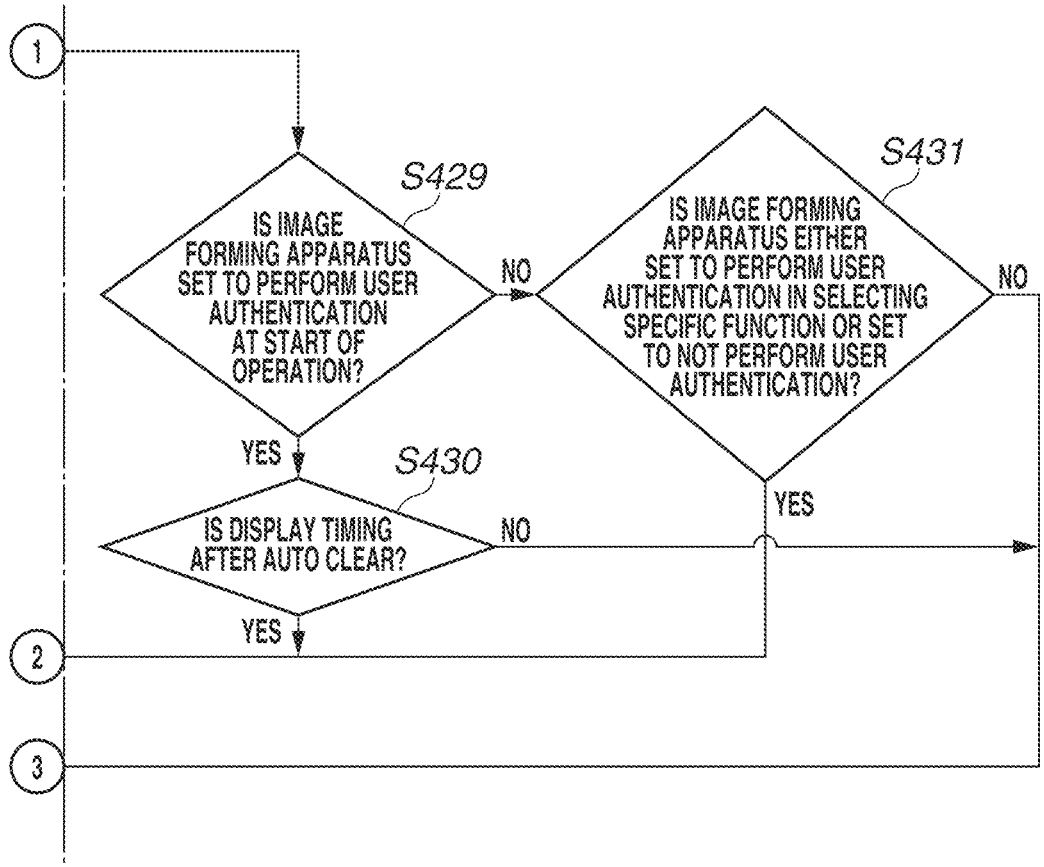

In step S401, the CPU 201 initially performs issuance processing (display trigger issuance processing) for issuing, if an event notification is received, a display trigger to display content based on the type of event notification received and the settings of the signage application 300. Details of the processing in step S401 will be described below with reference to FIG. 4B (FIGS. 4B-1 and 4B-2).

In step S402, the CPU 201 determines whether a display trigger is issued in step S401. If the CPU 201 determines that a display trigger is issued (YES in step S402), the processing proceeds to step S403. If the CPU 201 determines that no display trigger is issued (NO in step S402), the processing returns to step S401 to wait for the issuance of a display trigger.

In step S403, the CPU 201 acquires the path information about the content set on the setting screen of the signage application 300. Specifically, the content management unit 305 refers to the content setting management table 306 and acquires the path information about the content.

In step S404, the CPU 201 acquires the content to be displayed from the content server 120 based on the path information about the content, acquired in step S403, and reads the acquired content into the RAM 203.

In step S405, the CPU 201 controls display of the screen of the signage application 300 on the operation unit 209. The screen of the signage application 300 displays the content acquired in step S404, e.g., the web content 1500.

In step S406, the CPU 201 determines whether linked content is selected in the content displayed in step S405. Specifically, the CPU 201 determines whether the hyperlink 1501 to the web content 1500 is pressed. If the CPU 201 determines that the linked content is selected (YES in step S406), the processing proceeds to step S407. If CPU 201 determines that the linked content is not selected (NO in step S406), the processing of this flowchart ends.

In step S407, the CPU 201 determines whether the image forming apparatus 100 is in an authenticated state. In the present exemplary embodiment, the content is permitted to be printed if the image forming apparatus 100 is in the authenticated state. If the image forming apparatus 100 is in an unauthenticated state, the content is not permitted to be printed. If the CPU 201 determines that the image forming apparatus 100 is in the authenticated state (YES in step S407), the processing proceeds to step S408. If the CPU 201 determines that the image forming apparatus 100 is in the unauthenticated state (NO in step S407), the processing of this flowchart ends.

In step S408, the CPU 201 acquires the content to be printed from a server storing the linked content (e.g., the content server 120) and stores the content to be printed into the HDD 204. Specifically, the CPU 201 acquires the content to be printed 1510 based on the link information specified by the hyperlink 1501 and downloading the content to be printed 1510 into the HDD 204.

In step S409, the CPU 201 determines whether the download processing in step S408 is successful. If the CPU 201 determines that the download processing is successful (YES in step S409), the processing proceeds to step S410. If the CPU 201 determines that the download processing is failed (NO in step S409), the processing proceeds to step S413. Examples of an error causing the failure of the download processing may include an oversized data error and a communication error.

In step S413, the CPU 201 displays an error screen on the operation unit 209. For example, the CPU 201 displays the error message 1302 indicating details of the error as with the error screen 1301.

The CPU 201 may display an error screen if the downloaded content to be printed is not in a printable format. The processing of this flowchart ends.

In step S410, the CPU 201 displays a print dialog on the content displayed on the operation unit 209. For example, the CPU 201 displays the OK button 1603 for issuing an instruction to print the content to be printed and the cancel button 1602 for cancelling printing, similarly to the print dialog 1601.

In step S411, the CPU 201 determines whether an instruction to perform printing is given using the print dialog displayed in step S410. Specifically, the CPU 201 determines which button is pressed, the OK button 1603 or the cancel button 1602. If the CPU 201 determines that the instruction to perform printing is issued (YES in step S411), the processing proceeds to step S412. If the CPU 201 determines that an instruction to cancel printing is issued (NO in step S411), the processing of this flowchart ends.

In step S412, the CPU 201 prints the content to be printed downloaded into the HDD 204 in step S408. Specifically, the CPU 201 prints the content to be printed 1510. The processing of this flowchart then ends.

Next, details of the display trigger issuance processing performed in step S401 of FIG. 4A will be described in detail with reference to FIG. 4B.

In step S421, the CPU 201 determines whether an event notification is received. Specifically, the CPU 201 determines whether the event reception unit 307 receives a login event from the authentication processing unit 308, an auto clear event from the auto clear processing unit 309, or a print job start event from the print management unit 310. If the CPU 201 determines that an event notification is received (YES in step S421), the processing proceeds to step S422. If the CPU 201 determines that no event notification is received (NO in step S421), the processing returns to step S421 to wait for the reception of an event notification.

In step S422, the CPU 201 determines whether the setting to display content acquired by the signage application 300 is made. Specifically, the content management unit 305 acquires the setting value corresponding to the setting item 803 from the content setting management table 306, and determines whether the display of the signage application 300 is set to ON. If the CPU 201 determines that the display of the signage application 300 is set to OFF (NO in step S422), the processing returns to FIG. 4A. If the CPU 201 determines that the display of the signage application 300 is set to ON (YES in step S422), the processing proceeds to step S423.

In step S423, the CPU 201 determines whether the event notification received in step S421 is a print job start event. If the CPU 201 determines that the received event notification is a print job start event (YES in step S423), the processing proceeds to step S424. If the CPU 201 determines that the received event notification is not a print job start event (NO in step S423), the processing proceeds to step S426.

In step S424, the CPU 201 determines whether the setting to display content during printing is made. Specifically, the content management unit 305 acquires the setting value corresponding to the setting item 814 from the content setting management table 306, and determines whether the display during printing is set to ON. If the CPU 201 determines that the display during printing is set to ON (YES in step S424), the processing proceeds to step S425. If the CPU 201 determines that the display during printing is set to OFF (NO in step S424), the processing returns to FIG. 4A.

In step S425, the CPU 201 determines whether the application screen 1105 of FIG. 12B is displayed on the operation unit 209. If the CPU 201 determines that the application screen 1105 is not displayed (NO in step S425), the processing returns to FIG. 4A. If the CPU 201 determines that the application screen 1105 is displayed (YES in step S425), the processing proceeds to step S432.

In step S426, the CPU 201 determines whether the event notification received in step S421 is a login event or an auto clear event. If the CPU 201 determines that the received event notification is a login event (YES in step S426), the processing proceeds to step S427. If the CPU 201 determines that the received event notification is an auto clear event (NO in step S426), the processing proceeds to step S429.

In step S427, the CPU 201 determines whether the image forming apparatus 100 is set to perform user authentication at the start of operation. If the CPU 201 determines that the image forming apparatus 100 is not set to perform user authentication at the start of operation, i.e., is set to perform user authentication in selecting a specific function (NO in step S427), the processing returns to FIG. 4A. If the CPU 201 determines that the image forming apparatus 100 is set to perform user authentication at the start of operation (YES in step S427), the processing proceeds to step S428.

In step S428, the CPU 201 determines whether the setting to display content after a login is made. Specifically, the content management unit 305 acquires the setting value corresponding to the setting item 813 from the content setting management table 306, and determines whether the display timing of content is after a login. If the CPU 201 determines that the setting to display content after an auto clear is made (NO in step S428), the processing returns to FIG. 4A. If the CPU 201 determines that the setting to display content after a login is made (YES in step S428), the processing proceeds to step S432.

In step S429, the CPU 201 determines whether the image forming apparatus 100 is set to perform user authentication at the start of operation. If the CPU 201 determines that the image forming apparatus 100 is not set to perform user authentication at the start of operation (NO in step S429), the processing proceeds to step S431. If the CPU 201 determines that the image forming apparatus 100 is set to perform user authentication at the start of operation (YES in step S429), the processing proceeds to step S430.

In step S430, the CPU 201 determines whether the setting to display content after an auto clear is made. Specifically, the content management unit 305 acquires the setting value corresponding to the setting item 813 from the content setting management table 306, and determines whether the display timing of content is after an auto clear. If the CPU 201 determines that the setting to display content after a login is made (NO in step S430), the processing returns to FIG. 4A. If the CPU 201 determines that the setting to display content after an auto clear is made (YES in step S430), the processing proceeds to step S432.

In step S431, the CPU 201 determines whether the image forming apparatus 100 is either set to perform user authentication in selecting a specific function or set to not perform user authentication. If the CPU 201 determines that the image forming apparatus 100 is either set to perform user authentication in selecting a specific function or set to not perform user authentication (YES in step S431), the processing proceeds to step S432. If the CPU 201 determines that the image forming apparatus 100 is set to perform user authentication at the start of operation (NO in step S431), the processing returns to FIG. 4A.

In step S432, the CPU 201 issues a content display trigger. The processing then returns to FIG. 4A.

According to the first exemplary embodiment described above, the linked content to be printed 1510 can be easily printed by simply selecting the hyperlink 1501 in the web content 1500 displayed on the operation unit 209. The user using the image forming apparatus 100 can thus easily take out and check the information about the web content 1500. Moreover, the content to be printed 1510 is permitted to be printed if the web content 1500 is displayed in the authenticated state, but is not permitted to be printed if the web content 1500 is displayed in the unauthenticated state. In terms of security measures, this can avoid a situation where the content to be printed 1510 is permitted to be printed by anybody. In addition, a print log can be kept. As illustrated in FIG. 17B, in the unauthenticated state, the CPU 201 may display the linked content to be printed 1510 on the operation unit 209.

In the first exemplary embodiment, a method for printing the content to be printed by selecting a hyperlink in the content to be displayed has been described. The method according to the first exemplary embodiment is mostly effective in printing content on a web server, and is based on the embedment of the information about the content to be printed in the content to be displayed. However, the signage application 300 can handle content such as that on an SMB server, aside from that on the web server. In a second exemplary embodiment, a method capable of easily printing content to be printed regardless of the type of content to be displayed will be described.

<Content Setting>

FIG. 18 illustrates an example of a signage setting screen 600 according to the present exemplary embodiment. Differences from FIG. 7 will be mainly described below.

FIG. 18 is different from FIG. 7 in that a textbox 1801 and a checkbox 1802 are added. The textbox 1801 is an input field for inputting a path indicating the storage location of the content to be printed. Setting the path of the content to be printed enables specification of the content to be printed in association with the content to be displayed without a need to embed the information about the content to be printed in the content to be displayed in advance. The checkbox 1802 is used to switch a setting to print the content to be displayed on and off. If the checkbox 1802 is checked, the content specified by the path set in the textbox 621, i.e., the content to be displayed is handled as the content to be printed.

FIG. 19 is a diagram illustrating an example of a content setting management table 306 according to the present exemplary embodiment. FIG. 19 is different from FIG. 8 in that a setting item 1901 is added. The setting item 1901 is an item indicating the setting of the path information about the content to be printed. The path input into the textbox 1801 is set in the value.

<Screen Transition in Printing Content>

Figure 20:
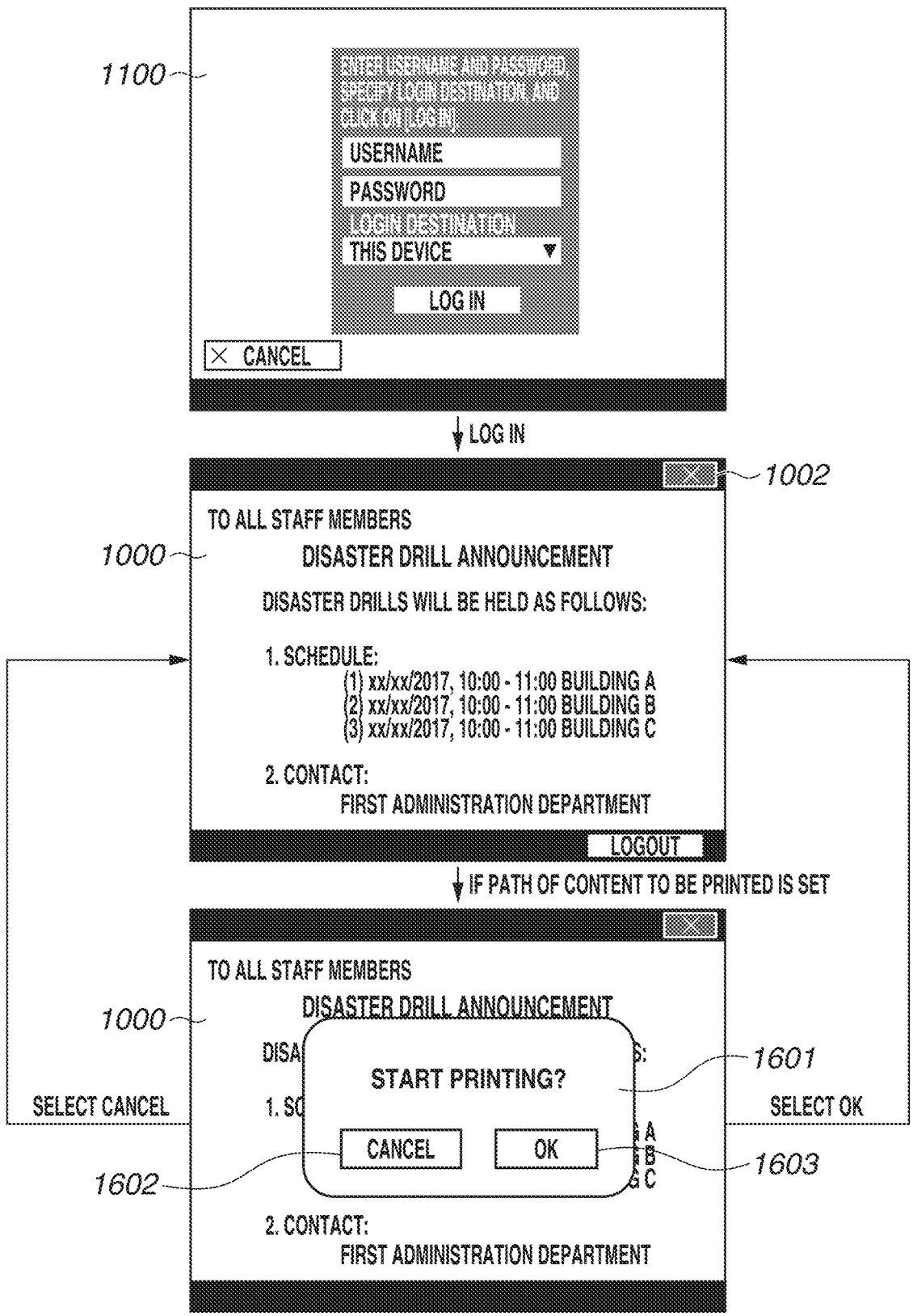
FIG. 20 is a diagram illustrating screen transitions according to a second exemplary embodiment.

FIG. 20 illustrates screen transition in a case where the same settings as with FIG. 11A are made and the path of the content to be printed is set in the textbox 1801 of FIG. 18.

An authentication screen 1100 is initially displayed on an operation unit 209. The image forming apparatus 100 performs user authentication using authentication information input on the authentication screen 1100. If the user authentication is successful, the image forming apparatus 100 performs login processing. After the login processing, the image forming apparatus 100 acquires web content 1000 from a content server 120, and displays the acquired web content 1000 on the operation unit 209. In the present exemplary embodiment, the web content 1000 is an example of first content. Here, if a path of content to be printed is set in the textbox 1801 of FIG. 18, a print dialog 1601 is displayed on the web content 1000. FIG. 20 illustrates an example where the print dialog 1601 is displayed to hide the web content 1000. However, a print instruction button may be displayed at a position not interfering with the visibility of the web content 1000 (e.g., beside a close button 1002 outside the content display area). If the user presses an OK button 1603 on the print dialog 1601, the image forming apparatus 100 prints the content to be printed and hides the print dialog 1601. In contrast, if the user presses a cancel button 1602 on the print dialog 1601, the image forming apparatus 100 cancels printing and hides the print dialog 1601.

<Content Print Processing>

Figure 21A:
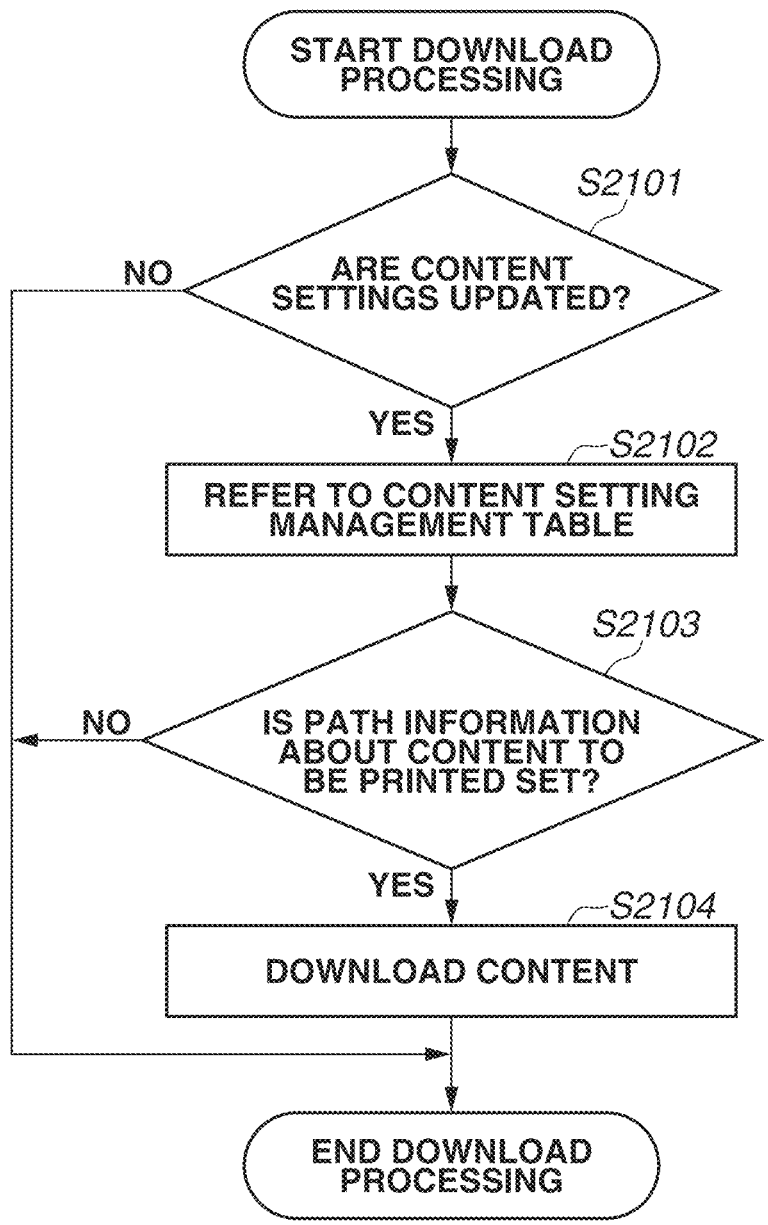
FIG. 21A is a flowchart illustrating download processing.

FIG. 21A is a flowchart illustrating processing for downloading content to be printed in advance if the path of the content to be printed is set in the textbox 1801 of FIG. 18. The processing of this flowchart is regularly performed after the image forming apparatus 100 is powered on, for example.

In step S2101, the CPU 201 determines whether the content settings of the signage application 300 are updated. Specifically, the CPU 201 determines whether an OK button 661 on the signage setting screen 600 is pressed. If the CPU 201 determines that the content settings are updated (YES in step S2101), the processing proceeds to step S2102. If the CPU 201 determines that the content settings are not updated (NO in step S2101), the processing of this flowchart ends.

In step S2102, the CPU 201 acquires the setting values set on the setting screen of the signage application 300. Specifically, a content management unit 305 reads the setting values of the content setting management table 306.

In step S2103, the CPU 201 determines whether path information about the content to be printed is set, based on the result of acquisition in step S2102. If the CPU 201 determines that the pass information is set (YES in step S2103), the processing proceeds to step S2104. If the CPU 201 determines that the pass information is not set (NO in step S2103), the processing of this flowchart ends.

In step S2104, the CPU 201 performs processing for acquiring the content to be printed from a server storing the content to be printed (e.g., content server 120) and downloading the content to be printed into the HDD 204. Specifically, the CPU 201 acquires the content specified in the textbox 1801 of FIG. 18. The processing of this flowchart ends.

According to the processing of the flowchart illustrated FIG. 21A described above, the content to be printed is downloaded when the content settings are updated. The image forming apparatus 100 can thus start to print the content immediately after a print instruction. The content to be printed may be downloaded at other timing, not necessarily upon the update of the content settings. For example, the content to be printed may be downloaded when a logout instruction is accepted or when auto clear processing is received.

Figure 21B:
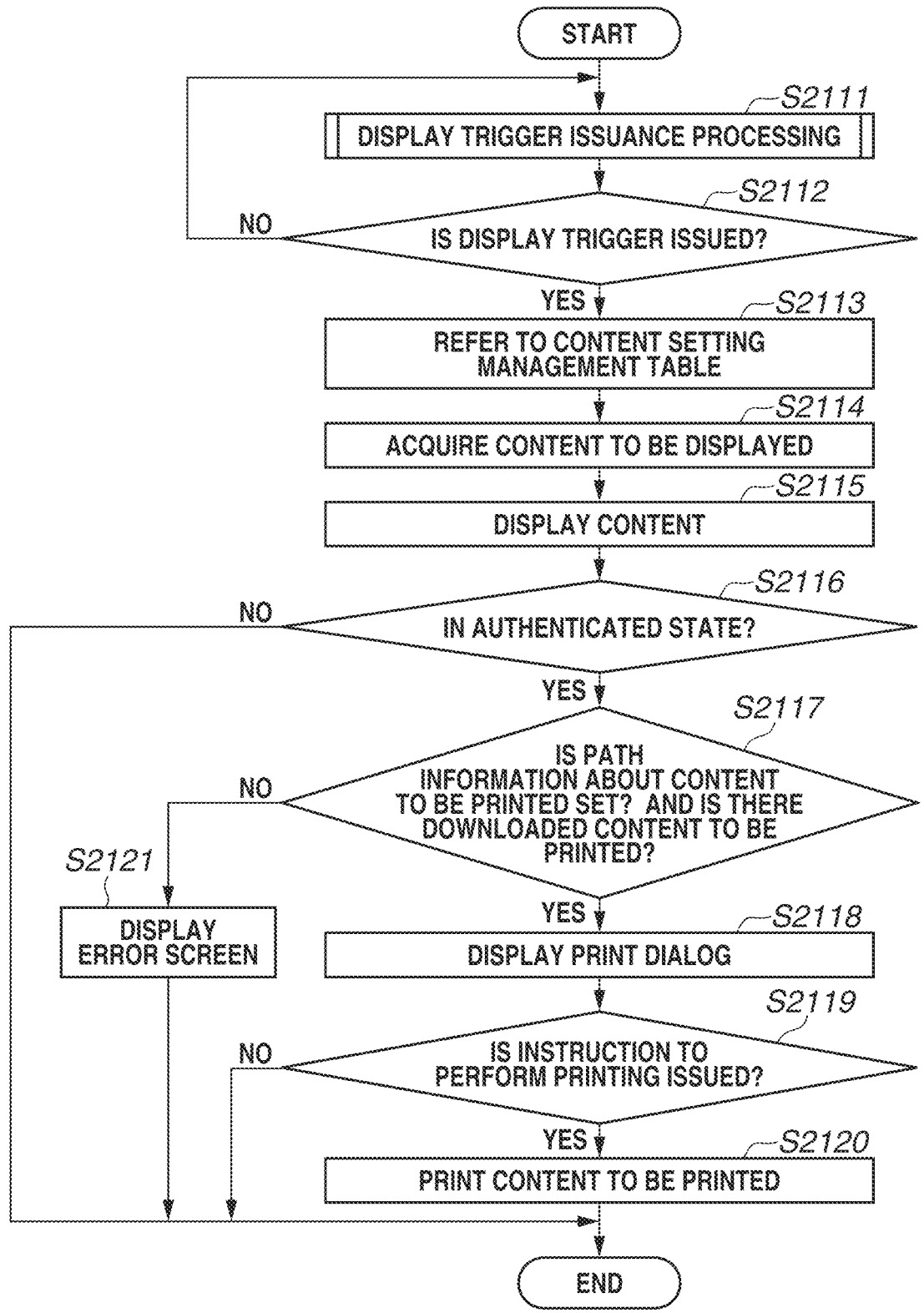
FIG. 21B is a flowchart illustrating content print processing according to the second exemplary embodiment.

FIG. 21B is a flowchart illustrating content print processing performed by the image forming apparatus 100 according to the present exemplary embodiment. Suppose that the path information about the content to be printed is set before the execution of this flowchart. The processing of the flowchart is regularly performed after the image forming apparatus 100 is powered on, for example.

The processing of steps S2111 to S2115 is similar to that of steps S401 to S405. A description thereof will thus be omitted.

In step S2116, the CPU 201 determines whether the image forming apparatus 100 is in an authenticated state. In the present exemplary embodiment, the content is permitted to be printed if the image forming apparatus 100 is in the authenticated state, and not permitted to be printed if the image forming apparatus 100 is in an unauthenticated state. If the CPU 201 determines that the image forming apparatus 100 is in the authenticated state (YES in step S2116), the processing proceeds to step S2117. If the CPU 201 determines that the image forming apparatus 100 is in the unauthenticated state (NO in step S2116), the processing of this flowchart ends.

In step S2117, the CPU 201 determines whether path information about content to be printed is set on the setting screen of the signage application 300 and there is content to be printed downloaded in step S2104. If the CPU 201 determines that path information about content to be printed is set and there is downloaded content to be printed (YES in step S2117), the processing proceeds to step S2118. In contrast, if the CPU 201 determines that no path information about content to be printed is set or if the CPU 201 determines that there is no downloaded content to be printed (NO in step S2117), the processing proceeds to step S2121.

In step S2121, the CPU 201 displays an error screen on the operation unit 209. For example, an error screen 1301 displays an error message 1302 indicating the absence of the content to be printed, for example. The processing of this flowchart ends.

In step S2118, the CPU 201 displays a print dialog on the content displayed on the operation unit 209. For example, the OK button 1603 for issuing an instruction to print the content to be printed and the cancel button 1602 for cancelling printing are displayed, similarly to the print dialog 1601.

In step S2119, the CPU 201 uses the print dialog displayed in step S2118 to determine whether an instruction to perform printing is given. Specifically, the CPU 201 determines which button is pressed, the OK button 1603 or the cancel button 1602. If the CPU 201 determines that the instruction to perform printing is issued (YES in step S2119), the processing proceeds to step S2120. If the CPU 201 determines that an instruction to cancel printing is issued (NO in step S2119), the processing of this flowchart ends.

In step S2120, the CPU 201 prints the downloaded content if the setting to print the displayed content on the setting screen of the signage application 300 is OFF. In contrast, if the setting to print the displayed content is ON, the CPU 201 prints the content displayed in step S2115. In such a case, the CPU 201 may handle the content displayed in step S2115 as the content to be printed instead of the downloaded content, or handle the content displayed in step S2115 and the downloaded content as the content to be printed. The processing of this flowchart then ends.

As described above, in the second exemplary embodiment, the path information about the content to be printed 1510 is set aside from the path information about the web content 1000 to be displayed. The information about the content to be printed 1510 therefore does not need to be embedded in the web content 1000. This enables printing of content on an SMB server in association with the web content 1000. The user using the image forming apparatus 100 can thus easily take out and check the information about the web content 1000. Moreover, the content to be printed 1510 is downloaded in advance like when the content settings are updated. The printing can thus be quickly performed without needing time to download the content after a print instruction is issued.

In the foregoing exemplary embodiments, the image forming apparatus 100 having a plurality of functions, such as a copy function and a scanner function, has been described as an example. However, the exemplary embodiments are also applicable to an image forming apparatus having only some of the functions. The exemplary embodiments may also be applied to other information processing apparatuses, such as a PC, a personal digital assistant (PDA), a mobile phone, a facsimile (FAX), a camera, a video camera, and other image viewers.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-182644, filed Nov. 9, 2021, which is hereby incorporated by reference herein in its entirety.

What is claimed is:

1. An image forming apparatus comprising:
an acquisition unit configured to, if a predetermined event related to a user operation is received, acquire first content that has been set;
a display control unit configured to control display of the acquired first content on a display unit, the display control unit displaying a setting screen on which information for displaying the first content and any timing as a timing for displaying the first content are settable, the any timing including at least a timing after authentication processing to the image forming apparatus and a timing after auto clear processing, the auto clear processing being processing of clearing a setting state on a screen displayed on the display unit of the image forming apparatus and returning to an initial value; and
a control unit configured to perform control so as to execute print processing of second content based on information related to the second content related to the first content being selected in the displayed first content and the image forming apparatus being authenticated, and so as not to execute the print processing of the second content based on the information related to the second content being selected in the displayed first content and the image forming apparatus not being authenticated, in a case where, as the timing for displaying the first content, the timing after authentication processing to the image forming apparatus is set on the setting screen.

2. The image forming apparatus according to claim 1, wherein the display control unit is configured to, if the information related to the second content is selected, control display of an instruction button configured to issue an instruction to print the second content, and wherein the control unit is configured to, if the instruction button is operated, control the printing of the second content.

3. The image forming apparatus according to claim 1, wherein the information related to the second content is a hyperlink including information indicating the second content.

4. The image forming apparatus according to claim 1, wherein the display control unit is configured to display the second content based on the information related to the second content being selected and the image forming apparatus not being authenticated.

5. The image forming apparatus according to claim 1,
wherein the first content includes link information indicating a link destination, and
wherein the control unit is configured to, if the link information is selected, control acquisition of the second content from an external apparatus storing the second content based on the selected link information, and storage of the acquired second content in a storage unit.

6. The image forming apparatus according to claim 1, wherein the predetermined event is a login event based on login processing.

7. The image forming apparatus according to claim 1, wherein the predetermined event is an auto clear event based on auto clear processing for resetting a state of the display unit in response to a lapse of a predetermined time without the user operation being made.

8. The image forming apparatus according to claim 1, wherein the predetermined event is a print job start event based on an instruction to start a print job.

9. The image forming apparatus according to claim 1, wherein the second content is a file in a Portable Document Format (PDF) format.

10. A non-transitory storage medium storing a program that when executed by a computer causes the computer to function as the image forming apparatus according to claim 1.

11. The image forming apparatus according to claim 1, wherein the information for displaying the first content is path information indicating a storage location of the first content.

12. The image forming apparatus according to claim 1, wherein, whether to display the first content at a timing print processing starts in the image forming apparatus is further settable on the setting screen.

13. The image forming apparatus according to claim 1, wherein, whether to display an error screen based on occurrence of an error in the image forming apparatus at the timing the first content is to be displayed is further settable on the setting screen.

14. An image forming apparatus comprising:
a setting unit configured to set path information indicating a storage location of each of first content and second content associated with the first content;
an acquisition unit configured to, if a predetermined event related to a user operation is received, acquire the first content based on the set path information;
a display control unit configured to control display of the acquired first content on a display unit, the display control unit displaying a setting screen on which information for displaying the first content and any timing as a timing for displaying the first content are settable, the any timing including at least a timing after authentication processing to the image forming apparatus and a timing after auto clear processing, the auto clear processing being processing of clearing a setting state on a screen displayed on the display unit of the image forming apparatus and returning to an initial value; and
a control unit configured to perform control so as to acquire the second content based on the set path information and execute print processing of the acquired second content based on the first content being displayed and the image forming apparatus being authenticated, and so as not to execute the print processing of the second content based on the first content being displayed and the image forming apparatus not being authenticated, in a case where, as the timing for displaying the first content, the timing after authentication processing to the image forming apparatus is set on the setting screen.

15. The image forming apparatus according to claim 14,
wherein the display control unit is configured to, if the first content is displayed, control display of an instruction button for issuing an instruction to print the second content, and
wherein the control unit is configured to, if the instruction button is operated, control the printing of the second content.

16. The image forming apparatus according to claim 14, wherein the control unit is configured to, before the first content is displayed, control the acquisition of the second content from an external apparatus storing the second content based on the set path information, and storage of the acquired second content in a storage unit.

17. The image forming apparatus according to claim 16, wherein the control unit is configured to execute printing of the second content stored in the storage unit based on the first content being displayed and the image forming apparatus being authenticated.

18. The image forming apparatus according to claim 14,
wherein the setting unit is configured to further set whether to print the first content, and
wherein the control unit is configured to, if a setting to print the first content is made, handle the first content as content to be printed, and if a setting to not print the first content is made, handle the second content as the content to be printed.

19. The image forming apparatus according to claim 14,
wherein the setting unit is configured to further set whether to print the first content, and
wherein the control unit is configured to, if a setting to print the first content is made, control printing of the first content as well as printing the second content.

* * * * *